United States Patent
Dong et al.

(10) Patent No.: US 10,651,969 B2
(45) Date of Patent: May 12, 2020

(54) SIGNAL PROCESSING METHOD AND TRANSMITTER

(71) Applicant: HUAWEI TECHNOLOGIES CO., LTD., Shenzhen, Guangdong (CN)

(72) Inventors: Pengpeng Dong, Shanghai (CN); Yuanzhou Hu, Shanghai (CN); Zongjie Wang, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/186,347

(22) Filed: Nov. 9, 2018

(65) Prior Publication Data

US 2019/0081728 A1    Mar. 14, 2019

Related U.S. Application Data

(63) Continuation of application No. PCT/CN2016/081695, filed on May 11, 2016.

(51) Int. Cl.
   *H04L 1/00* (2006.01)
   *H04L 27/26* (2006.01)
   *H04L 25/03* (2006.01)

(52) U.S. Cl.
   CPC ...... *H04L 1/0008* (2013.01); *H04L 25/03834* (2013.01); *H04L 27/26* (2013.01);
   (Continued)

(58) Field of Classification Search
   CPC . H04L 1/0008; H04L 25/03834; H04L 27/26; H04L 27/2605; H04L 27/2607; H04L 27/2626; H04L 27/2628
   See application file for complete search history.

(56) References Cited

U.S. PATENT DOCUMENTS 8,009,750 B2    8/2011  Chrabieh et al.
2006/0203710 A1  9/2006  Mukkavilli et al.
(Continued)

FOREIGN PATENT DOCUMENTS

CN      1812387 A    8/2006
CN    101064703 A   10/2007
(Continued)

OTHER PUBLICATIONS

R1-162199 Qualcomm Incorporated,"Waveform Candidates",3GPP TSG-RAN WG1 #84b , Apr. 11-15, 2016,total 26 pages.
(Continued)

*Primary Examiner* — Janice N Tieu
(74) *Attorney, Agent, or Firm* — Womble Bond Dickinson (US) LLP

(57) ABSTRACT

Method disclosed is applied to an OFDM wireless transmission system which includes at least two OFDM symbols, and includes: adding a zero power padding ZP to a tail end of each of the at least two OFDM symbols; adding data of $N_w$ consecutive points at one end of a first OFDM symbol of the at least two OFDM symbols to the ZP at the other end of the first OFDM symbol, so that the data of the $N_w$ points is a prefix and/or a suffix of the first OFDM symbol, where the first OFDM symbol includes data of N points, $N>N_w$; and performing point multiplication processing with symmetric time domain window function on the data of the $N_w$ points at the two ends of the first OFDM symbol to which the prefix and/or the suffix is added, so that a sum of point coefficients corresponding to the symmetric time domain window function is 1.

12 Claims, 7 Drawing Sheets

(52) U.S. Cl.
CPC ...... *H04L 27/2605* (2013.01); *H04L 27/2607* (2013.01); *H04L 27/2626* (2013.01); *H04L 27/2628* (2013.01)

(56) References Cited

U.S. PATENT DOCUMENTS

| | | |
|---|---|---|
| 2007/0258529 A1 | 11/2007 | Liang et al. |
| 2008/0002645 A1* | 1/2008 | Seki .................. H04L 25/03834 370/338 |
| 2009/0207926 A1 | 8/2009 | Huang et al. |
| 2015/0333944 A1* | 11/2015 | Bae .................. H04L 25/03821 375/296 |
| 2015/0349987 A1 | 12/2015 | Soriaga et al. |
| 2015/0372843 A1 | 12/2015 | Bala et al. |

FOREIGN PATENT DOCUMENTS

| | | |
|---|---|---|
| CN | 101098327 A | 1/2008 |
| CN | 101461203 A | 6/2009 |
| CN | 102055708 A | 5/2011 |
| CN | 104995885 A | 10/2015 |
| WO | 2004017547 A2 | 2/2004 |
| WO | 2014123926 A1 | 8/2014 |

OTHER PUBLICATIONS

R1-162516 LG Electronics,"Flexible CP-OFDM with variable ZP",3GPP TSG RAN WG1 Meeting #84bis,Busan, Korea Apr. 11-15, 2016,total 5 pages.

R1-162335 Fujitsu,"On frame structure for New Rat",3GPP TSG RAN WG1 Meeting #84bis,Busan, Korea, Apr. 11-15, 2016,total 5 pages.

R1-162889 Nokia et al.,"OFDM based Waveform for 5G new radio interface",3GPP TSG-RAN WG1 #84bis,Busan, Korea, Apr. 11-15, 2016,total 3 pages.

RWS-150010 Nokia,"Nokia Vision and Priorities for Next Generation Radio Technology",3GPP RAN workshop on 5G,Phoenix, AZ, USA, Sep. 17-18, 2015,total 17 pages.

R1-162890 Nokia et al.,"5G Waveforms for the Multi-Service Air Interface below 6 GHz",3GPP TSG-RAN WG1 #84bis,total 4 pages.

* cited by examiner

SIGNAL PROCESSING METHOD AND TRANSMITTER

CROSS-REFERENCE TO RELATED APPLICATIONS

This application is a continuation of International Application No. PCT/CN2016/081695, filed on May 11, 2016, the disclosure of which is hereby incorporated by reference in its entirety.

TECHNICAL FIELD

The present disclosure relates to the field of mobile communications technologies, and in particular, to a signal processing method and a transmitter.

BACKGROUND

An out of band (Out Of Band, OOB) refers to an amplitude value in a band in which no data is transmitted and that is out of the range of an operating band in a spectrum. An OOB is an important indicator of a wireless transmission system. A desirable OOB suppression spectrum reduces frequency guard bandwidth used between different communications systems or different services, and improves spectrum efficiency. In addition, a desirable OOB greatly reduces interference between different communications systems (for example, 3G and 4G LTE), thereby improving demodulation performance of a receiver.

Different communications system protocols stipulate a spectrum profile that a waveform applied to a system should satisfy, that is, stipulates a minimum lower limit required by an OOB. As wireless communications technologies are constantly evolved, spectrum resource utilization should be constantly improved. In addition, as application service scenarios are constantly expanded, interfering sources of users from other bands also become increasingly complex. Therefore, a waveform of a low OOB is indispensable for current and future wireless communications systems.

An important factor affecting an OOB is discontinuity of OFDM symbols in a time domain. Because two neighboring OFDM symbols are independent from each other, both an amplitude and a phase are discontinuous. Therefore, energy obtained by adding energies, in a spectrum graph, at remote frequencies located out of a data transmission band is relatively high, that is, an OOB is excessively high, affecting performance of a wireless transmission system.

SUMMARY

Embodiments of the present disclosure provide a signal processing method and a transmitter, to improve continuity between neighboring OFDM symbols to reduce an OOB.

According to a first aspect of the embodiments of the present disclosure, a signal processing method is provided. The method is applied to an OFDM wireless transmission system, the system includes at least two OFDM symbols, and the method includes:

adding, by a transmitter, a zero power padding ZP to a tail end of each of the at least two OFDM symbols;

adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol, where the first OFDM symbol includes data of N points, and $N>N_w$; and performing, by the transmitter, point multiplication processing with symmetric time domain window function on the data of the $N_w$ points at the two ends of the first OFDM symbol to which the prefix and/or the suffix is added, so that a sum of point coefficients corresponding to the symmetric time domain window function is 1.

An important factor affecting an OOB is discontinuity of OFDM symbols in a time domain. Because two neighboring OFDM symbols are independent from each other, both an amplitude and a phase are discontinuous. Therefore, energy obtained by adding remote frequencies located out of a data transmission band is relatively high in a spectrum graph. In the embodiment of the present disclosure, the ZP is added to a tail end of the OFDM symbol, and then data of $N_w$ points at a head end of the current OFDM symbol is added to the ZP at the tail end of the current OFDM symbol to serve as the suffix of the current OFDM symbol, or data of $N_w$ points at the tail end of the current OFDM symbol is added to a ZP at a tail end of a previous neighboring OFDM symbol of the current OFDM symbol to serve as the prefix of the current OFDM symbol. Continuity between neighboring OFDM symbols can be improved, and an OOB can be effectively reduced after a window function point multiplication processing operation.

With reference to the first aspect of the embodiments of the present disclosure, in a first implementation of the first aspect of the embodiments of the present disclosure, the adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

adding, by the transmitter, data of $N_w$ consecutive points at a head end of the first OFDM symbol of the at least two OFDM symbols to a start location in a ZP at a tail end of the first OFDM symbol, so that the data of the $N_w$ points is used as the suffix of the first OFDM symbol.

When the transmitter selects a quantity of data points to be added, a value of $N_w$ may change according to an OOB requirement, and the symmetric time domain window function may use a window satisfying a requirement. It is required that a window added by the data of the $N_w$ consecutive points at the head end of the OFDM symbol outputted by IFFT is symmetric to a window added by the data of the $N_w$ points that is added to the start location in the ZP to serve as the suffix of the OFDM symbol, and the sum of the point coefficients corresponding to the window function is 1.

Because the head end of the OFDM symbol does not offset forward, and the data of the $N_w$ consecutive points at the head end is added to the start location in the ZP at the tail end of the OFDM symbol, the receiver can perform overlapping and adding without assistance of precise timing information, so that the data of the $N_w$ consecutive points at the head end and the data of the first $N_w$ points in the ZP at the tail end of the OFDM symbol on which symmetric time domain window point multiplication is performed complement each other to form a self-cycle, thereby eliminating interference.

With reference to the first aspect of the embodiments of the present disclosure, in a second implementation of the first aspect of the embodiments of the present disclosure, the adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

adding, by the transmitter, data of $N_w$ consecutive points at a tail end of the first OFDM symbol of the at least two OFDM symbols to an end location in a ZP at a tail end of a second OFDM symbol of the at least two OFDM symbols, so that the data of the $N_w$ points is used as the prefix of the first OFDM symbol, where the second OFDM symbol is a previous neighboring OFDM symbol of the first OFDM symbol, and a tail end of the ZP is connected to a head end of the first OFDM.

When the transmitter selects a quantity of data points to be added and the symmetric time domain window function, a requirement is the same as that in the foregoing embodiment, and specifics are not limited herein.

In the embodiment, because the head end of the OFDM symbol offsets forward, the receiver requires assistance of precise timing information to perform overlapping and adding, thereby eliminating interference.

With reference to the first aspect of the embodiments of the present disclosure, in a third implementation of the first aspect of the embodiments of the present disclosure, the adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

adding, by the transmitter, data of $N_w$ consecutive points at a head end of the first OFDM symbol of the at least two OFDM symbols to a start location in a ZP at a tail end of the first OFDM symbol, so that the data of the $N_w$ points is used as the suffix of the first OFDM symbol;

and adding data of $N_w$ consecutive points at the tail end of the first OFDM symbol of the at least two OFDM symbols to an end location in a ZP at a tail end of a second OFDM symbol of the at least two OFDM symbols, so that the data of the $N_w$ points is used as the prefix of the first OFDM symbol, where the second OFDM symbol is a previous neighboring OFDM symbol of the first OFDM symbol, and a tail end of the ZP is connected to the head end of the first OFDM.

In the embodiment, for the OFDM symbol, the prefix is added to the ZP at the tail end of the previous neighboring OFDM symbol, and the suffix is added to the ZP at the tail end of the current OFDM symbol. When the transmitter selects a quantity of data points to be added, the value of $N_w$ may be the same as that required in the foregoing embodiment, or may be half the value of $N_w$ in the foregoing embodiment, that is, $N_w/2$. In this way, a time domain window function that is the same as that in the foregoing embodiment is obtained, and specifics are not limited herein.

In the embodiment, because the head end of the OFDM symbol offsets forward, the receiver requires assistance of precise timing information to perform overlapping and adding, thereby eliminating interference.

With reference to the first aspect of the embodiments of the present disclosure, in a fourth implementation of the first aspect of the embodiments of the present disclosure, before the adding, by a transmitter, a ZP to a tail end of each of the at least two OFDM symbols, the method further includes:

dividing, by the transmitter, the first OFDM symbol of the at least two OFDM symbols into F parts, where $F≥2$; and the adding, by a transmitter, a ZP to a tail end of each of the at least two OFDM symbols includes:

adding, by the transmitter, a ZP to a tail end of divided data of each part obtained after dividing the first OFDM symbol of the at least two OFDM symbols.

While ensuring an OOB, symbol division and windowing can better support immediate ACK/NACK feedback of a broad subcarrier signal of a low-delay service in a hybrid frame format, and do not waste a resource GP introduced to align with a GP for a narrow subcarrier signal.

With reference to the fourth implementation of the first aspect of the embodiments of the present disclosure, in a fifth implementation of the first aspect of the embodiments of the present disclosure, the adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

adding, by the transmitter, data of $N_w^f$ consecutive points at a head end of divided data of a part f+1 obtained after dividing the first OFDM symbol of the at least two OFDM symbols to a start location in a ZP at a tail end of divided data of a part f, so that the data of the $N_w^f$ points is used as a suffix of the divided data of the part f; and adding data of $N_w^{F-1}$ consecutive points at a head end of divided data of a part 0 to a start location in a ZP at a tail end of divided data of a part F−1, so that the data of the $N_w^{F-1}$ points is used as a suffix of the divided data of the part F−1, where $0≤f<F$; and the performing, by the transmitter, point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

performing, by the transmitter, point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; and performing point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

With reference to the fourth implementation of the first aspect of the embodiments of the present disclosure, in a sixth implementation of the first aspect of the embodiments of the present disclosure, the adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

adding, by the transmitter, data of $N_w^f$ consecutive points at a tail end of divided data of a part f obtained after dividing the first OFDM symbol of the at least two OFDM symbols to an end location in the ZP at the tail end of the divided data of the part f, so that the data of the $N_w^f$ points is used as a prefix of divided data of a part f+1; and adding data of a continuous $N_w^{F-1}$ length at a head end of divided data of a part 0 to a start location in the ZP at a tail end of divided data of a part F−1, so that the data of the $N_w^{F-1}$ points is used as a suffix of the divided data of the part F−1, where $0≤f<F$; and the performing, by the transmitter, point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

performing, by the transmitter, point multiplication processing with symmetric time domain window function on the data of a continuous $N_w^f$ length at the tail end of the divided data of the part f and the data of the $N_w^f$ points in the prefix at the head end of the divided data of the part f+1, so that the sum of the point coefficients corresponding to the symmetric window function is 1; and performing point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

With reference to the fourth implementation of the first aspect of the embodiments of the present disclosure, in a seventh implementation of the first aspect of the embodiments of the present disclosure, the adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

adding, by the transmitter, the data of the $N_w^f$ consecutive points at the head end of the divided data of the part f+1 obtained after dividing the first OFDM symbol of the at least two OFDM symbols to the start location in the ZP at the tail end of the divided data of the part f, so that the data of the $N_w^f$ points is used as the suffix of the divided data of the part f; and adding the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the performing, by the transmitter, point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

performing, by the transmitter, point multiplication processing with symmetric time domain window function on the data of the consecutive points at the head end of the divided data of the part f+1 and the data of the $N_w^f$ points in the suffix at the tail end of the divided data of the part f, so that the sum of the point coefficients corresponding to the symmetric window function is 1; and performing point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

With reference to the fourth implementation of the first aspect of the embodiments of the present disclosure, in an eighth implementation of the first aspect of the embodiments of the present disclosure, the adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

adding, by the transmitter, the data of the $N_w^f$ consecutive points at the tail end of the divided data of the part f obtained after dividing the first OFDM symbol of the at least two OFDM symbols to the end location in the ZP at the tail end of the divided data of the part f, so that the data of the $N_w^f$ points is used as the prefix of the divided data of the part f+1; and adding the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the performing, by the transmitter, point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

performing, by the transmitter, point multiplication processing with symmetric time domain window function on the data of a continuous $N_w^f$ length at the tail end of the divided data of the part f and the data of the $N_w^f$ points in the prefix at the head end of the divided data of the part f+1, so that the sum of the point coefficients corresponding to the symmetric window function is 1; and performing point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

With reference to the fourth implementation of the first aspect of the embodiments of the present disclosure, in a ninth implementation of the first aspect of the embodiments of the present disclosure, the adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

adding, by the transmitter, the data of the $N_w^f$ consecutive points at the head end of the divided data of the part f+1 obtained after dividing the first OFDM symbol of the at least two OFDM symbols to the start location in the ZP at the tail end of the divided data of the part f, so that the data of the $N_w^f$ points is used as the suffix of the divided data of the part f; adding the data of the $N_w^{F-1}$ consecutive points at the head end of the divided data of the part 0 to the start location in the ZP at the tail end of the divided data of the part F−1, so that the data of the $N_w^{F-1}$ points is used as the suffix of the divided data of the part F−1; and adding the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the performing, by the transmitter, point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

performing, by the transmitter, point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; performing point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1; and performing point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

With reference to the fourth implementation of the first aspect of the embodiments of the present disclosure, in a tenth implementation of the first aspect of the embodiments of the present disclosure, the adding, by the transmitter, data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

adding, by the transmitter, the data of the $N_w^f$ consecutive points at the tail end of the divided data of the part f obtained after dividing the first OFDM symbol of the at least two OFDM symbols to the end location in the ZP at the tail end of the divided data of the part f, so that the data of the $N_w^f$ points is used as the prefix of the divided data of the part f+1; adding the data of the continuous $N_w^{F-1}$ length at the head end of the divided data of the part 0 to the start location in the ZP at the tail end of the divided data of the part F−1, so that the data of the $N_w^{F-1}$ points is used as the suffix of the divided data of the part F−1; and adding the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the performing, by the transmitter, point multiplication processing with symmetric time domain window function on the data of the $N_w$ points at the two ends of the first OFDM symbol to which the prefix and/or the suffix is added, so that a sum of point coefficients corresponding to a symmetric time domain window function is 1 includes:

performing, by the transmitter, point multiplication processing with symmetric time domain window function on the data of the continuous $N_w^f$ length at the tail end of the divided data of the part f and the data of the $N_w^f$ points in the prefix at the head end of the divided data of the part f+1, so that the sum of the point coefficients corresponding to the symmetric window function is 1; performing point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1; and performing point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

According to a second aspect of the embodiments of the present disclosure, a transmitter is provided. The transmitter is applied to an OFDM wireless transmission system, the system includes at least two OFDM symbols, and the transmitter includes:

an adding unit, configured to: add a zero power padding ZP to a tail end of each of the at least two OFDM symbols; and add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol, where the first OFDM symbol includes data of N points, and N>$N_w$; and a windowing unit, configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1.

With reference to the second aspect of the embodiments of the present disclosure, in a first implementation of the second aspect of the embodiments of the present disclosure, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to add data of $N_w$ consecutive points at a head end of the first OFDM symbol of the at least two OFDM symbols to a start location in a ZP at a tail end of the first OFDM symbol, so that the data of the $N_w$ points is used as the suffix of the first OFDM symbol.

With reference to the second aspect of the embodiments of the present disclosure, in a second implementation of the second aspect of the embodiments of the present disclosure, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to add data of $N_w$ consecutive points at a tail end of the first OFDM symbol of the at least two OFDM symbols to an end location in a ZP at a tail end of a second OFDM symbol of the at least two OFDM symbols, so that the data of the $N_w$ points is used as the prefix of the first OFDM symbol, where the second OFDM symbol is a previous neighboring OFDM symbol of the first OFDM symbol, and a tail end of the ZP is connected to a head end of the first OFDM.

With reference to the second aspect of the embodiments of the present disclosure, in a third implementation of the second aspect of the embodiments of the present disclosure, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add data of $N_w$ consecutive points at a head end of the first OFDM symbol of the at least two OFDM symbols to a start location in a ZP at a tail end of the first OFDM symbol, so that the data of the $N_w$ points is used as the suffix of the first OFDM symbol; and add data of $N_w$ consecutive points at a tail end of the first OFDM symbol of the at least two OFDM symbols to an end location in a ZP at a tail end of a second OFDM symbol of the at least two OFDM symbols, so that the data of the $N_w$ points is used as the prefix of the first OFDM symbol, where the second OFDM symbol is a previous neighboring OFDM symbol of the first OFDM symbol, and a tail end of the ZP is connected to the head end of the first OFDM.

With reference to the second aspect of the embodiments of the present disclosure, in a fourth implementation of the second aspect of the embodiments of the present disclosure, before the adding unit adds the ZP to the tail end of each of the at least two OFDM symbols, the transmitter further includes:

a division unit, configured to divide the first OFDM symbol of the at least two OFDM symbols into F parts, where F≥2, where the adding unit is configured to add a ZP to a tail end of each of the at least two OFDM symbols includes:

the adding unit is configured to add a ZP to a tail end of divided data of each part obtained by dividing the first OFDM symbol of the at least two OFDM symbols.

With reference to the fourth implementation of the second aspect of the embodiments of the present disclosure, in a fifth implementation of the second aspect of the embodiments of the present disclosure, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add data of $N_w^f$ consecutive points at a head end of divided data of a part f+1 obtained after dividing the first OFDM symbol of the at least two OFDM symbols to a start location in a ZP at a tail end of divided data of a part f, so that the data of the $N_w^f$ points is used as a suffix of the divided data of the part f; and add data of $N_w^{F-1}$ consecutive points at a head end of divided data of a part 0 to a start location in a ZP at a tail end of divided data of a part F−1, so that the data of the $N_w^{F-1}$ points is used as a suffix of the divided data of the part F−1, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; and perform point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

With reference to the fourth implementation of the second aspect of the embodiments of the present disclosure, in a sixth implementation of the second aspect of the embodiments of the present disclosure, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add data of $N_w^f$ consecutive points at a tail end of divided data of a part f obtained after dividing the first OFDM symbol of the at least two OFDM symbols to an end location in the ZP at the tail end of the divided data of the part f, so that the data of the $N_w^f$ points is used as a prefix of divided data of a part f+1; and add data of a continuous $N_w^{F-1}$ length at a head end of divided data of a part 0 to a start location in the ZP at a tail end of divided data of a part F−1, so that the data of the $N_w^{F-1}$ points is used as a suffix of the divided data of the part F−1, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of a continuous length at the tail end of the divided data of the part f and the data of the $N_w^f$ points in the prefix at the head end of the divided data of the part f+1, so that the sum of the point coefficients corresponding to the symmetric window function is 1; and perform point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

With reference to the fourth implementation of the second aspect of the embodiments of the present disclosure, in a seventh implementation of the second aspect of the embodiments of the present disclosure, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add the data of the $N_w^f$ consecutive points at the head end of the divided data of the part f+1 obtained after dividing the first OFDM symbol of the at least two OFDM symbols to the start location in the ZP at the tail end of the divided data of the part f, so that the data of the $N_w^f$ points is used as the suffix of the divided data of the part f; and add the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; and perform point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

With reference to the fourth implementation of the second aspect of the embodiments of the present disclosure, in an eighth implementation of the second aspect of the embodiments of the present disclosure, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add the data of the $N_w^f$ consecutive points at the tail end of the divided data of the part f obtained after dividing the first OFDM symbol of the at least two OFDM symbols to the end location in the ZP at the tail end of the divided data of the part f, so that the data of the $N_w^f$ points is used as the prefix of the divided data of the part f+1; and add the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of a continuous $N_w^f$ length at the tail end of the divided data of the part f and the data of the $N_w^f$ points in the prefix at the head end of the divided data of the part f+1, so that the sum of the point coefficients corresponding to the symmetric window function is 1; and perform point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

With reference to the fourth implementation of the second aspect of the embodiments of the present disclosure, in a ninth implementation of the second aspect of the embodiments of the present disclosure, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add the data of the $N_w^f$ consecutive points at the head end of the divided data of the part f+1 obtained by dividing the first OFDM symbol of the at least two OFDM symbols to the start location in the ZP at the tail end of the divided data of the part f, so that the data of the $N_w^f$ points is used as the suffix of the divided data of the part f; add the data of the $N_w^{F-1}$ consecutive points at the head end of the divided data of the part 0 to the start location in the ZP at the tail end of the divided data of the part F−1, so that the data of the $N_w^{F-1}$ points is used as the suffix of the divided data of the part F−1; and add the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; perform point multiplication processing with symmetric time domain window function on the data of the w consecutive points at the head end of the divided data of the part 0 and the data of the w points in the suffix at the tail end of the divided data of the part F−1, so that the sum of the point coefficients corresponding to the symmetric window function is 1; and perform point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

With reference to the fourth implementation of the second aspect of the embodiments of the present disclosure, in a tenth implementation of the second aspect of the embodiments of the present disclosure, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add the data of the $N_w^f$ consecutive points at the tail end of the divided data of the part f obtained by dividing the first OFDM symbol of the at least two OFDM symbols to the end location in the ZP at the tail end of the divided data of the part f, so that the data of the $N_w^f$ points is used as the prefix of the divided data of the part f+1; add the data of the continuous $N_w^{F-1}$ length at the head end of the divided data of the part 0 to the start location in the ZP at the tail end of the divided data of the part F−1, so that the data of the $N_w^{F-1}$ points is used as the suffix of the divided data of the part F−1; and add the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of the continuous $N_w^f$ length at the tail end of the divided data of the part f and the data of the $N_w^f$ points in the prefix at the head end of the divided data of the part f+1, so that the sum of the point coefficients corresponding to the symmetric window function is 1; perform point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1; and perform point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

According to a third aspect of the embodiments of the present disclosure, a transmitter is provided, applied to an OFDM wireless transmission system, where the system includes at least two OFDM symbols, the transmitter includes: a processor, a memory, and a bus, the processor is connected to the memory by using the bus, the memory is configured to store program code, and the processor is configured to execute the program code to perform the signal processing method according to any one of the first aspect to the tenth implementation of the first aspect.

In the technical solutions provided above, the transmitter first adds the ZP to the tail end of each OFDM symbol, then adds the data of the $N_w$ consecutive points at one end of the OFDM symbol to the ZP at the other end of the OFDM symbol, so that the data of the $N_w$ points is used as the prefix and/or the suffix of the OFDM symbol, and performs symmetric time domain window function point multiplication processing on the data of the $N_w$ points at the two ends of the first OFDM symbol to which the prefix and/or the suffix is added, so that the sum of the point coefficients corresponding to the symmetric time domain window function is 1. Therefore, compared with the prior art, the embodiments of the present disclosure improve continuity between neighboring OFDM symbols by performing symmetric time domain window function point multiplication processing on the OFDM symbol, thereby effectively reducing an OOB.

DESCRIPTION OF EMBODIMENTS

Figure 1:
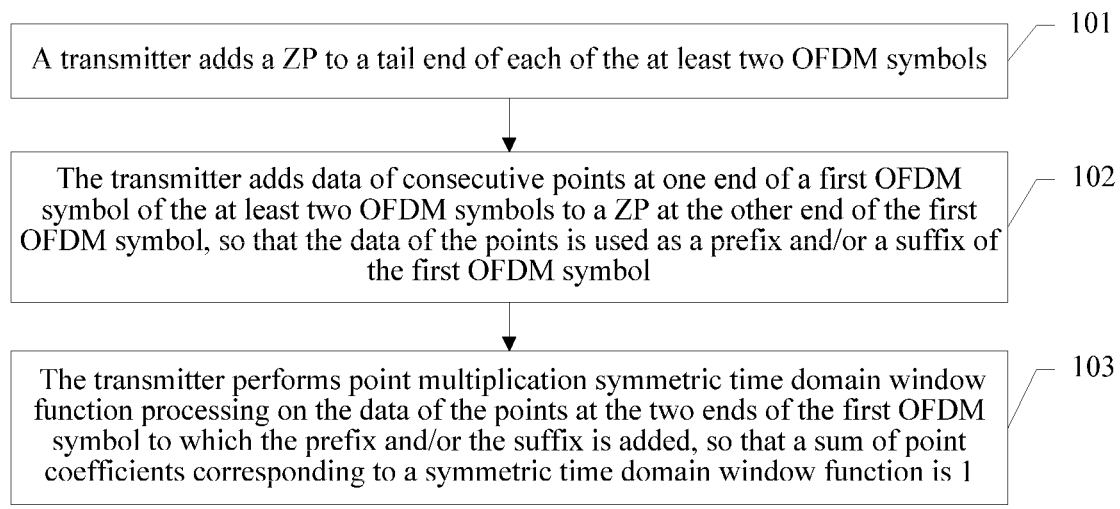
FIG. 1 is a flowchart of an embodiment of a signal processing method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons skilled in the art based on the embodiments of the present disclosure without creative efforts shall fall within the protection scope of the present disclosure.

In the specification, claims, and accompanying drawings of the present disclosure, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of blocks or units is not necessarily limited to those expressly listed blocks or units, but may include other blocks or units not expressly listed or inherent to such a process, method, system, product, or device.

Persons skilled in the art should know that the present disclosure is not only applied to a Long Term Evolution (Long Term Evolution, LTE) system of a universal mobile communications technology, but also may be applied to other wireless communications systems, for example, a Global System for Mobile Communications (Global System for Mobile Communications, GSM), a Universal Mobile Telecommunications System (Universal Mobile Telecommunications System, UMTS), a Code Division Multiple Access (Code Division Multiple Access, CDMA) system, a future evolved network system, and the like.

Different communications system protocols stipulate a spectrum profile that a waveform applied to a system should satisfy, that is, stipulates a minimum lower limit required by an OOB. As wireless communications technologies are constantly evolved, spectrum resource utilization should be constantly improved. In addition, as application service scenarios are constantly expanded, interfering sources of users from other bands also become increasingly complex. Therefore, a waveform of a low OOB is indispensable for current and future wireless communications systems.

An important factor affecting an OOB is discontinuity of OFDM symbols in a time domain. Because two neighboring OFDM symbols are independent from each other, both an amplitude and a phase are discontinuous. Therefore, energy obtained by adding remote frequencies located out of a data transmission band is relatively high in a spectrum graph.

Based on this, in the embodiments of the present disclosure, a window function point multiplication operation performed on an OFDM symbol improves continuity between neighboring OFDM symbols, and can effectively reduce an OOB.

Referring to FIG. 1, FIG. 1 is a flowchart of an embodiment of a signal processing method according to an embodiment of the present disclosure. The method is applied to an OFDM wireless transmission system, the system includes at least two OFDM symbols, and two neighboring OFDM symbols are discontinuous. As shown in FIG. 1, the method includes the following blocks.

101. A transmitter adds a ZP to a tail end of each of the at least two OFDM symbols.

The transmitter first inputs a bit data stream generated by LTE Turbo coding or other 5G coding to a QAM modulator to perform QAM modulation, then performs an IFFT operation on a frequency domain symbol obtained after QAM modulation, to obtain an OFDM symbol, and finally adds a ZP to a tail end of the OFDM symbol.

It should be noted that if a single-carrier time domain symbol is obtained after QAM modulation, a DFT operation should be performed to transform the time domain symbol to a frequency domain symbol, then zero padding is performed, and an IFFT operation is performed. If a multicarrier frequency domain symbol is obtained after QAM modulation, zero padding is directly performed, and an IFFT operation is performed.

In addition, the ZP added to the tail end of the OFDM symbol may be used as a guard period (Guard Period, GP), and a length of the ZP generally should ensure a delay envelope of a coverage channel.

102. The transmitter adds data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol.

The first OFDM symbol includes data of N points, where $N > N_w$.

103. The transmitter performs point multiplication processing with symmetric time domain window function on the data of the $N_w$ points at the two ends of the first OFDM symbol to which the prefix and/or the suffix is added, so that a sum of point coefficients corresponding to the symmetric time domain window function is 1.

Figure 2:
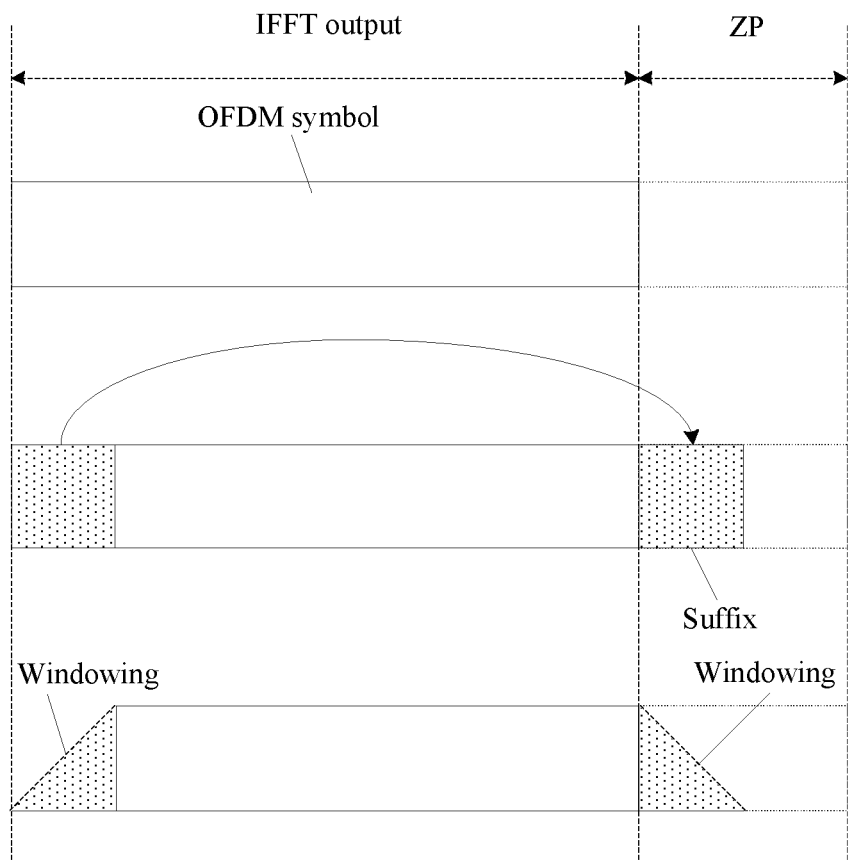
FIG. 2 is a schematic diagram of an embodiment of a signal processing method according to an embodiment of the present disclosure.

As shown in FIG. 2, FIG. 2 is a schematic diagram of an embodiment of a signal processing method according to an embodiment of the present disclosure. Optionally, block 102 may specifically include:

adding, by the transmitter, data of $N_w$ consecutive points at a head end of the first OFDM symbol of the at least two OFDM symbols to a start location in the ZP at a tail end of the first OFDM symbol, so that the data of the $N_w$ points is used as the suffix of the first OFDM symbol.

Specifically, after the at least two OFDM symbols (FIG. 2 shows only one OFDM symbol) are output (IFFT output shown in FIG. 2) by inverse fast Fourier transform (Inverse Fast Fourier Transform, IFFT), the transmitter sequentially performs operations of the following several blocks:

First block: Add the ZP to the tail end of the OFDM symbol.

Second block: Add the data of the $N_w$ consecutive points at the head end of the OFDM symbol to the start location in the ZP at the tail end of the OFDM symbol to serve as the suffix of the OFDM symbol.

Third block: Perform point multiplication processing with symmetric time domain window function (that is, windowing) on the data of the $N_w$ consecutive points at the head end of the OFDM symbol and the data of the $N_w$ points that serves as the suffix of the OFDM symbol, so that the sum of the point coefficients corresponding to the symmetric time domain window function is 1.

A sample quantity of the window function is the same as a sample quantity of a cyclic suffix, and the window function supports various types of existing typical linear and nonlinear windows. When the transmitter selects a quantity of data points to be added, a value of $N_w$ may change according to an OOB requirement, and the symmetric time domain window function may use a window satisfying a requirement. It is required that a window added by the data of the $N_w$ consecutive points at the head end of the OFDM symbol outputted by IFFT is symmetric to a window added by the data of the $N_w$ points that is added to the start location in the ZP to serve as the suffix of the OFDM symbol, and the sum of the point coefficients corresponding to the window function is 1.

Figure 3:
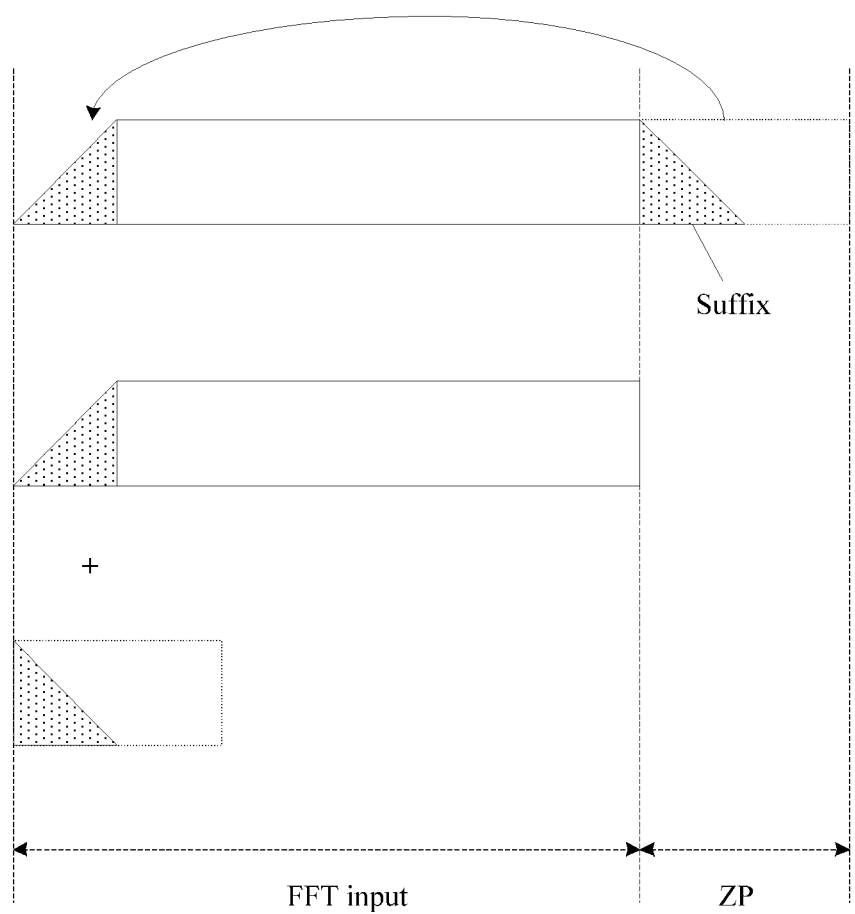
FIG. 3 is another schematic diagram of an embodiment of a signal processing method according to an embodiment of the present disclosure.

As shown in FIG. 3, FIG. 3 is another schematic diagram of an embodiment of a signal processing method according to an embodiment of the present disclosure. When receiving data, a receiver receives time domain data with size of sum of a point quantity of discrete Fourier transform (Discrete Fourier Transform, FFT) input (FFT input shown in FIG. 3) and a ZP length, and the time domain data having the ZP length at a tail end of clipped data is moved to a head end of the clipped data, and is overlapped with and added to the time domain data having the ZP length at the head end, to obtain a complete OFDM symbol of IFFT output.

In the embodiment, because the head end of the OFDM symbol does not offset forward, and the data of the $N_w$ consecutive points at the head end is added to the start location in the ZP at the tail end of the OFDM symbol, the receiver can perform overlapping and adding without assistance of precise timing information, so that the data of the $N_w$ consecutive points at the head end and the data of the first $N_w$ points in the ZP at the tail end of the OFDM symbol on which symmetric time domain window point multiplication is performed complement each other to form a self-cycle, thereby eliminating interference.

Optionally, in downlink data transmission, a downlink OFDM symbol sent may be implemented based on the following mathematical expression:

Continuous time domain data $s_l^{(p)}(t)$ that is transmitted on an antenna port P and that is in an OFDM symbol l of a downlink timeslot is defined as:

$$s_l^{(p)}(t) = \begin{cases} w(t) \left[ \sum_{k=-\lfloor N_{RB}^{DL} N_{sc}^{RB}/2 \rfloor}^{-1} a_{k^{(-)},l}^{(p)} \cdot e^{j2\pi k \Delta ft} + \sum_{k=1}^{\lfloor N_{RB}^{DL} N_{sc}^{RB}/2 \rfloor} a_{k^{(+)},l}^{(p)} \cdot e^{j2\pi k \Delta ft} \right], & 0 \le t < (N_{w,l} + N) \times T_s \\ 0, & (N_{w,l} + N) \times T_s \le t < (N_{ZP,l} + N) \times T_s \end{cases}$$

where
$k^{(-)} = k + \lfloor N_{RB}^{DL} N_{sc}^{RB}/2 \rfloor$, $k^{(+)} = k + \lfloor N_{RB}^{DL} N_{sc}^{RB}/2 \rfloor - 1$, $a_{k,l}^{(p)}$ is complex-number data transmitted on a resource element (k,l) on the antenna port p, $T_s$ is a minimum sampling interval, w(t) is a time domain window function point multiplication coefficient, $N_{w,l}$ is a length of symmetric time domain windows for which a sum of coefficients is 1 in the time domain window point multiplication function in a symbol l, $N_{ZP,l}$ is a length of a zero power padding that should be added to the symbol l, a length of a zero power padding that is actually added is $N_{ZP,l}-N_{w,l}, N_{w,l} \leq N_{ZP,l}$, and N is an IFFT symbol length.

The time domain window function w(t) is defined as:

$$w(t) = \begin{cases} w_{ini}(t), & 0 \leq t < N_w \times T_s \\ 1, & N_w \times T_s \leq t < N \times T_s \\ 1 - w_{ini}(t), & N \times T_s \leq t < (N_w + N) \times T_s \end{cases}$$

where $w_{ini}(t)$ is a window function whose coefficient gradually increases and satisfies $w_{ini}(t)+w_{ini}(n_w \times T_s-t)=1$.

Optionally, in uplink data transmission, an uplink SC-FDMA symbol sent may be implemented based on the following mathematical expression:

Continuous time domain data $s_l^{(p)}(t)$ that is transmitted on the antenna port P and that is in an SC-FDMA symbol l of an uplink timeslot is defined as:

$$s_l^{(p)}(t) = \begin{cases} w(t) \left[ \sum_{k=-\lfloor N_{RB}^{UL}N_{sc}^{RB}/2 \rfloor}^{\lceil N_{RB}^{UL}N_{sc}^{RB}/2 \rceil - 1} a_{k^{(-)},l}^{(p)} \cdot e^{j2\pi(k+1/2)\Delta f t} \right], & 0 \leq t < (N_{w,l} + N) \times T_s \\ 0, & (N_{w,l} + N) \times T_s \leq t < (N_{ZP,l} + N) \times T_s \end{cases}$$

where $k^{(-)}=k+\lfloor N_{RB}^{DL}N_{sc}^{RB}/2 \rfloor$, and definitions of w(t) and $N_{w,l}$ are the same as those on a downlink.

Figure 4:
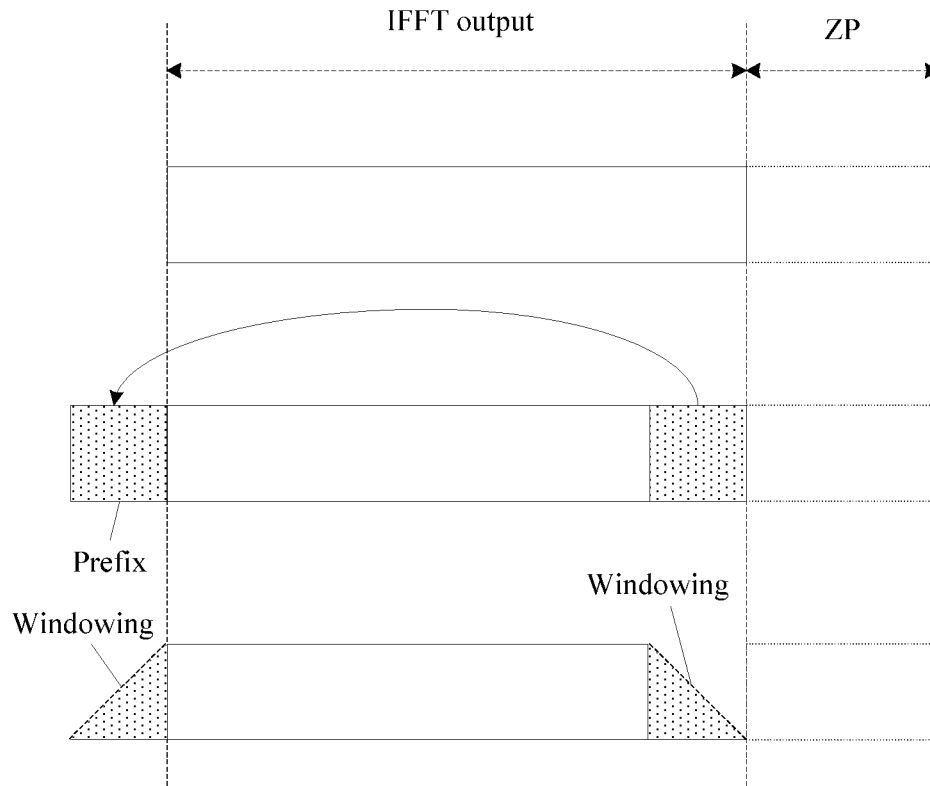
FIG. 4 is a schematic diagram of another embodiment of a signal processing method according to an embodiment of the present disclosure.

As shown in FIG. 4, FIG. 4 is a schematic diagram of another embodiment of a signal processing method according to an embodiment of the present disclosure. Optionally, block 102 may specifically include:

adding, by the transmitter, of $N_w$ consecutive points at the tail end of the first OFDM symbol of the at least two OFDM symbols to an end location in a ZP at a tail end of a second OFDM symbol of the at least two OFDM symbols, so that the data of the $N_w$ points is used as the prefix of the first OFDM symbol, where the second OFDM symbol is a previous neighboring OFDM symbol of the first OFDM symbol, and a tail end of the ZP is connected to the head end of the first OFDM.

When the transmitter selects a quantity of data points to be added and the symmetric time domain window function, a requirement is the same as that in the foregoing embodiment, and specifics are not limited herein.

In the embodiment, because the head end of the OFDM symbol offsets forward, the receiver requires assistance of precise timing information to perform overlapping and adding, thereby eliminating interference.

Figure 5:
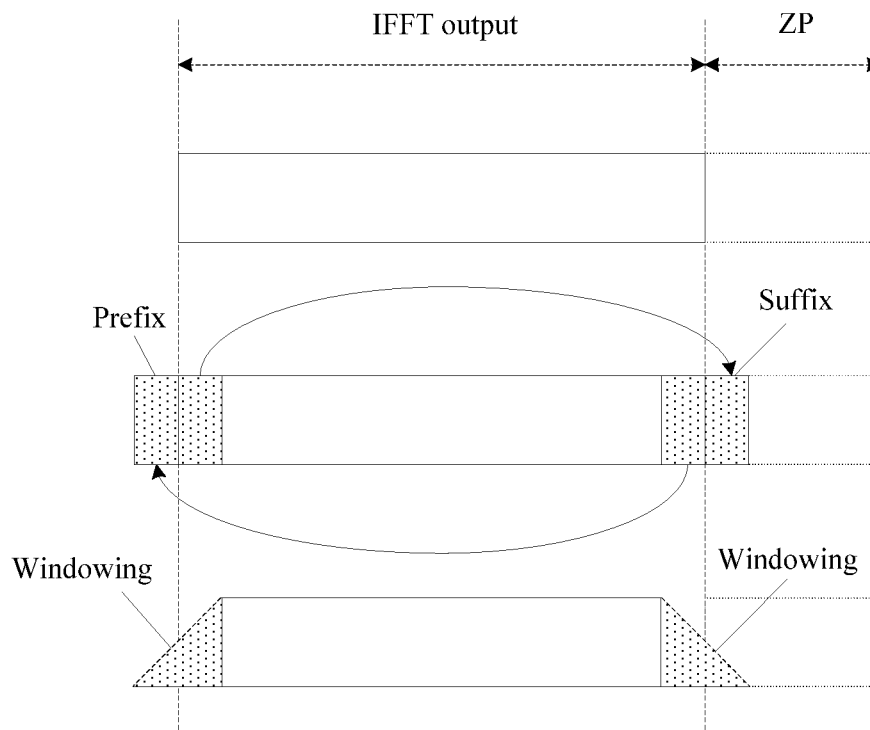
FIG. 5 is a schematic diagram of another embodiment of a signal processing method according to an embodiment of the present disclosure.

As shown in FIG. 5, FIG. 5 is a schematic diagram of another embodiment of a signal processing method according to an embodiment of the present disclosure. Optionally, block 102 may specifically include:

adding, by the transmitter, data of $N_w$ consecutive points at the head end of the first OFDM symbol of the at least two OFDM symbols to the start location in a ZP at the tail end of the first OFDM symbol, so that the data of the $N_w$ points is used as the suffix of the first OFDM symbol; and adding the data of the $N_w$ consecutive points at the tail end of the first OFDM symbol of the at least two OFDM symbols to an end location in a ZP at a tail end of a second OFDM symbol of the at least two OFDM symbols, so that the data of the $N_w$ points is used as the prefix of the first OFDM symbol, where the second OFDM symbol is a previous neighboring OFDM symbol of the first OFDM symbol, and a tail end of the ZP is connected to the head end of the first OFDM.

It should be noted that in the embodiment, for the OFDM symbol, the prefix is added to the ZP at the tail end of the previous neighboring OFDM symbol, and the suffix is added to the ZP at the tail end of the current OFDM symbol. When the transmitter selects a quantity of data points to be added, the value of $N_w$ may be the same as that required in the foregoing embodiment, or may be half the value of $N_w$ in the foregoing embodiment, that is, $N_w/2$. In this way, a time domain window function that is the same as that in the foregoing embodiment is obtained, and specifics are not limited herein.

In the embodiment, because the head end of the OFDM symbol offsets forward, the receiver requires assistance of precise timing information to perform overlapping and adding, thereby eliminating interference.

Figure 6:
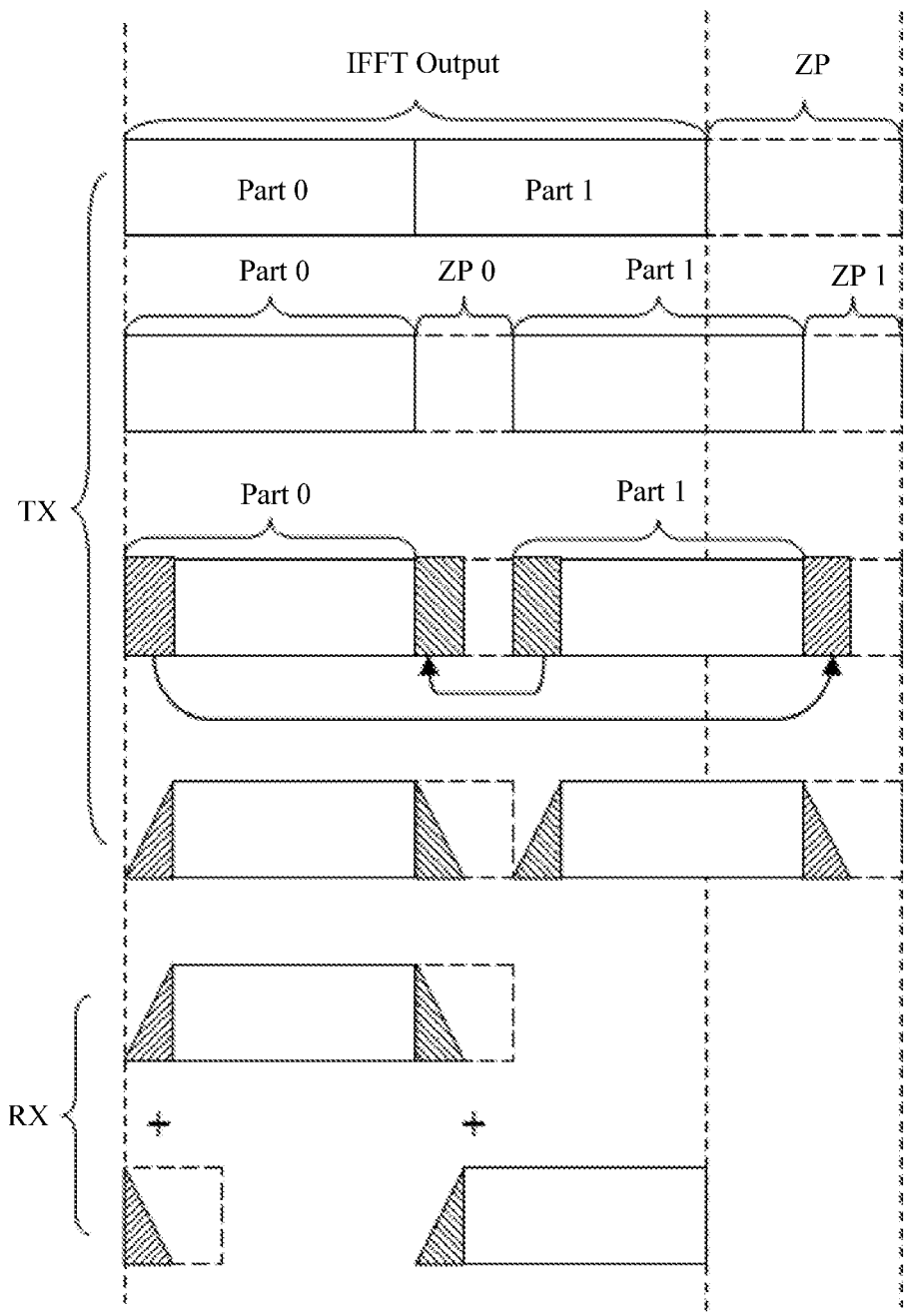
FIG. 6 is a schematic diagram of another embodiment of a signal processing method according to an embodiment of the present disclosure.

As shown in FIG. 6, FIG. 6 is a schematic diagram of another embodiment of a signal processing method according to an embodiment of the present disclosure. Optionally, before block 101, the method may further include:

dividing, by the transmitter, the first OFDM symbol of the at least two OFDM symbols into F parts (a part 0 part 0 and a part 1 part 1 at a transmit end TX shown in FIG. 6), where F≥2.

Based on this, block 101 may specifically include:

adding, by the transmitter, a ZP to a tail end of divided data of each part obtained after dividing the first OFDM symbol of the at least two OFDM symbols (a ZP 0 and a ZP 1 shown in FIG. 6).

Certainly, a ZP may be alternatively added between neighboring two pieces of divided data to perform isolation, and specifics are not limited herein.

It should be noted that lengths of divided data obtained after dividing the OFDM symbol may be different, and lengths of zero power paddings added to tail ends of the divided data may also be different.

Optionally, block 102 may specifically include:

adding, by the transmitter, data of $N_w^f$ consecutive points at a head end of divided data of a part f+1 obtained after dividing the first OFDM symbol of the at least two OFDM symbols to a start location in a ZP at a tail end of divided data of a part f, so that the data of the $N_w^f$ points is used as a suffix of the divided data of the part f; and adding data of $N_w^{F-1}$ consecutive points at a head end of divided data of a part 0 to a start location in a ZP at a tail end of divided data of a part F-1, so that the data of the $N_w^{F-1}$ points is used as a suffix of the divided data of the part F-1, where 0≤f<F.

For the divided data of the part f and the divided data of the part f+1 that are neighboring with each other, the data of the $N_w^f$ consecutive points at the head end of the divided data of the part may be added to the start location in the ZP at the tail end of the divided data of the part f, to serve as the suffix of the divided data of the part f. Alternatively, data of $N_w^f$ consecutive points at the tail end of the divided data of the part f may be added to an end location in the ZP at the tail end of the divided data of the part f, to serve as a prefix of the divided data of the part f+1. Specifics are not limited herein.

For the divided data of the part 0 and the divided data of the part F-1, the data of the $N_w^{F-1}$ consecutive points at the head end of the divided data of the part 0 may be added to the start location in the ZP at the tail end of the divided data of the part F-1, to serve as the suffix of the divided data of the part F−1. Alternatively, data of $N_w^{F-1}$ consecutive points at the tail end of the divided data of the part F−1 may be added to an end location in a ZP at a tail end of previous neighboring divided data or a ZP at a tail end of a previous neighboring OFDM symbol at the head end of the divided data of the part 0, to serve as a prefix of the divided data of the part 0. Alternatively, the data of the $N_w^{F-1}$ consecutive points at the head end of the divided data of the part 0 may be added to the start location in the ZP at the tail end of the divided data of the part F−1, to serve as the suffix of the divided data of the part F−1, and the data of the $N_w^{F-1}$ consecutive points at the tail end of the divided data of the part F−1 may be added to the end location in the ZP at the tail end of the previous neighboring divided data or the ZP at the tail end of the previous neighboring OFDM symbol at the head end of the divided data of the part 0, to serve as the prefix of the divided data of the part 0. Specifics are not limited herein.

Further, block 103 may specifically include:

performing, by the transmitter, point multiplication processing with symmetric time domain window function on the data of the consecutive points at the head end of the divided data of the part f+1 and the data of the $N_w^f$ points in the suffix at the tail end of the divided data of the part f, so that the sum of the point coefficients corresponding to the symmetric window function is 1; and performing point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

Optionally, when the data of the $N_w^f$ consecutive points at the tail end of the divided data of the part f is added to the end location in the ZP at the tail end of the divided data of the part f, to serve as the prefix of the divided data of the part f+1, and the data of the $N_w^{F-1}$ consecutive points at the head end of the divided data of the part 0 is added to the start location in the ZP at the tail end of the divided data of the part F−1, to serve as the suffix of the divided data of the part F−1, block 102 may specifically include:

adding, by the transmitter, the data of the $N_w^f$ consecutive points at the tail end of the divided data of the part f obtained after dividing the first OFDM symbol of the at least two OFDM symbols to the end location in the ZP at the tail end of the divided data of the part f, so that the data of the $N_w^f$ points is used as the prefix of the divided data of the part f+1; and adding the data of a continuous $N_w^{F-1}$ length at the head end of the divided data of the part 0 to the start location in the ZP at the tail end of the divided data of the part F−1, so that the data of the $N_w$ w points is used as the suffix of the divided data of the part F−1, where 0≤f<F.

Further, block 103 may specifically include:

performing, by the transmitter, point multiplication processing with symmetric time domain window function on the data of a continuous $N_w^f$ length at the tail end of the divided data of the part f and the data of the $N_w^f$ points in the prefix at the head end of the divided data of the part f+1, so that the sum of the point coefficients corresponding to the symmetric window function is 1; and performing point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

Optionally, when the data of the $N_w^f$ consecutive points at the head end of the divided data of the part f+1 is added to the start location in the ZP at the tail end of the divided data of the part f, to serve as the suffix of the divided data of the part f, and the data of the $N_w^{F-1}$ consecutive points at the tail end of the divided data of the part F−1 is added to the end location in the ZP at the tail end of the previous neighboring OFDM symbol at the head end of the divided data of the part 0, to serve as the prefix of the divided data of the part 0, block 102 may specifically include:

adding, by the transmitter, the data of the $N_w^f$ consecutive points at the head end of the divided data of the part f+1 obtained after dividing the first OFDM symbol of the at least two OFDM symbols to the start location in the ZP at the tail end of the divided data of the part f, so that the data of the $N_w^{F-1}$ points is used as the suffix of the divided data of the part f; and adding the data of the $N_w^{F-1}$ consecutive points at the tail end of the divided data of the part F−1 to an end location in a ZP at a tail end of previous neighboring divided data or the ZP at the tail end of the previous neighboring OFDM symbol at the head end of the divided data of the part 0, so that the data of the $N_w^{F-1}$ points is used as the prefix of the divided data of the part 0, where 0≤f<F.

Further, block 103 may specifically include:

performing, by the transmitter, point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; and performing point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

Optionally, when the data of the $N_w^f$ consecutive points at the tail end of the divided data of the part f is added to the end location in the ZP at the tail end of the divided data of the part f, to serve as the prefix of the divided data of the part f+1, and the data of the $N_w^{F-1}$ consecutive points at the tail end of the divided data of the part F−1 is added to the end location in the ZP at the tail end of the previous neighboring OFDM symbol at the head end of the divided data of the part 0, to serve as the prefix of the divided data of the part 0, block 102 may specifically include:

adding, by the transmitter, the data of the $N_w^f$ consecutive points at the tail end of the divided data of the part f obtained after dividing the first OFDM symbol of the at least two OFDM symbols to the end location in the ZP at the tail end of the divided data of the part f, so that the data of the $N_w^f$ points is used as the prefix of the divided data of the part f+1; and adding the data of the $N_w^{F-1}$ consecutive points at the tail end of the divided data of the part F−1 to an end location in a ZP at a tail end of previous neighboring divided data or the ZP at the tail end of the previous neighboring OFDM symbol at the head end of the divided data of the part 0, so that the data of the $N_w^{F-1}$ points is used as the prefix of the divided data of the part 0, where 0≤f<F.

Further, block 103 may specifically include:

performing, by the transmitter, point multiplication processing with symmetric time domain window function on the data of a continuous $N_w^f$ length at the tail end of the divided data of the part f and the data of the $N_w^f$ points in the prefix at the head end of the divided data of the part f+1, so that the sum of the point coefficients corresponding to the symmetric window function is 1; and performing point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

Optionally, when the data of the $N_w^f$ consecutive points at the head end of the divided data of the part f+1 is added to the start location in the ZP at the tail end of the divided data of the part f, to serve as the suffix of the divided data of the part f, the data of the $N_w^{F-1}$ consecutive points at the head end of the divided data of the part 0 is added to the start location in the ZP at the tail end of the divided data of the part F−1, to serve as the suffix of the divided data of the part F−1, and the data of the $N_w^{F-1}$ consecutive points at the tail end of the divided data of the part F−1 is added to the end location in the ZP at the tail end of the previous neighboring OFDM symbol at the head end of the divided data of the part 0, to serve as the prefix of the divided data of the part 0, block 102 may specifically include:

adding, by the transmitter, the data of the $N_w^f$ consecutive points at the head end of the divided data of the part f+1 obtained after dividing the first OFDM symbol of the at least two OFDM symbols to the start location in the ZP at the tail end of the divided data of the part f, so that the data of the $N_w^f$ points is used as the suffix of the divided data of the part f; adding the data of the $N_w^{F-1}$ consecutive points at the head end of the divided data of the part 0 to the start location in the ZP at the tail end of the divided data of the part F−1, so that the data of the $N_w^{F-1}$ points is used as the suffix of the divided data of the part F−1; and adding the data of the $N_w^{F-1}$ consecutive points at the tail end of the divided data of the part F−1 to an end location in a ZP at a tail end of previous neighboring divided data or the ZP at the tail end of the previous neighboring OFDM symbol at the head end of the divided data of the part 0, so that the data of the $N_w^{F-1}$ points is used as the prefix of the divided data of the part 0, where 0≤f<F.

Further, block 103 may specifically include:

performing, by the transmitter, point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; performing point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1; and performing point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

Optionally, when the data of the $N_w^f$ consecutive points at the tail end of the divided data of the part f is added to the end location in the ZP at the tail end of the divided data of the part f, to serve as the prefix of the divided data of the part f+1, the data of the $N_w^{F-1}$ consecutive points at the head end of the divided data of the part 0 is added to the start location in the ZP at the tail end of the divided data of the part F−1, to serve as the suffix of the divided data of the part F−1, and the data of the $N_w^{F-1}$ consecutive points at the tail end of the divided data of the part F−1 is added to the end location in the ZP at the tail end of the previous neighboring OFDM symbol at the head end of the divided data of the part 0, to serve as the prefix of the divided data of the part 0, block 102 may specifically include:

adding, by the transmitter, the data of the $N_w^f$ consecutive points at the tail end of the divided data of the part f obtained after dividing the first OFDM symbol of the at least two OFDM symbols to the end location in the ZP at the tail end of the divided data of the part f, so that the data of the $N_w^f$ points is used as the prefix of the divided data of the part f+1; adding the data of the continuous $N_w^{F-1}$ length at the head end of the divided data of the part 0 to the start location in the ZP at the tail end of the divided data of the part F−1, so that the data of the $N_w^{F-1}$ points is used as the suffix of the divided data of the part F−1; and adding the data of the $N_w^{F-1}$ consecutive points at the tail end of the divided data of the part F−1 to an end location in a ZP at a tail end of previous neighboring divided data or the ZP at the tail end of the previous neighboring OFDM symbol at the head end of the divided data of the part 0, so that the data of the $N_w$ points is used as the prefix of the divided data of the part 0, where 0≤f<F.

Further, block 103 may specifically include:

performing, by the transmitter, point multiplication processing with symmetric time domain window function on the data of the continuous $N_w^f$ length at the tail end of the divided data of the part f and the data of the $N_w^f$ points in the prefix at the head end of the divided data of the part f+1, so that the sum of the point coefficients corresponding to the symmetric window function is 1; performing point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1; and performing point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

For divided data of two different neighboring parts, values of quantities $N_w^f$ of data points added may be different, and window function types used may also be different.

Optionally, in downlink data transmission, a downlink OFDM symbol sent may be implemented based on the following mathematical expression:

When time domain data of each symbol is divided into two parts (F=2), continuous time domain data $s_l^{(p)}(t)$ that is transmitted on the antenna port p and that is in the OFDM symbol l in a downlink timeslot is defined as:

$$s_l^{(p)}(t) =$$

$$\begin{cases} w_l^0(t) \left[ \sum_{k=-\lfloor N_{RB}^{DL}N_{sc}^{RB}/2 \rfloor}^{-1} a_{k^{(-)},l}^{(p)} \cdot e^{j2\pi k \Delta ft} + \sum_{k=1}^{\lceil N_{RB}^{DL}N_{sc}^{RB}/2 \rceil} a_{k^{(+)},l}^{(p)} \cdot e^{j2\pi k \Delta ft} \right], & 0 \leq t < (N_{w,l}^0 + N_l^0) \times T_s \\ 0, & (N_{w,l}^0 + N_l^0) \times T_s \leq t < (N_{ZP,l}^0 + N_l^0) \times T_s \\ w_l^1(t - (N_{ZP,l}^0 + N_l^0) \times T_s) \left[ \sum_{k=-\lfloor N_{RB}^{DL}N_{sc}^{RB}/2 \rfloor}^{-1} a_{k^{(-)},l}^{(p)} \cdot e^{j2\pi k \Delta f(t - N_{ZP,l}^0 T_s)} + \sum_{k=1}^{\lceil N_{RB}^{DL}N_{sc}^{RB}/2 \rceil} a_{k^{(+)},l}^{(p)} \cdot e^{j2\pi k \Delta f(t - N_{ZP,l}^0 T_s)} \right], & (N_{ZP,l}^0 + N_l^0) \times T_s \leq t < (N_{ZP,l}^0 + N_{w,l}^1 + N) \times T_s \\ 0, & (N_{ZP,l}^0 + N_{w,l}^1 + N) \times T_s \leq t < (N_{ZP,l} + N) \times T_s \end{cases}$$

$k^{(-)} = k + \lfloor N_{RB}^{DL} N_{sc}^{RB}/2 \rfloor$, $k^{(+)} = k + \lfloor N_{RB}^{DL} N_{sc}^{RB}/2 \rfloor - 1$, $a_{k,l}^{(p)}$ is complex-number data transmitted on a resource element (k,l) on the antenna port p, $w_l^0(t)/w_l^1(t)$ is a time domain window function point multiplication coefficient of divided data of a part 0/1 in a symbol l, $N_{w,l}^0/N_{w,l}^1$ is a length of symmetric time domain windows for which a sum of coefficients is 1 in the time domain window point multiplication function of the divided data of the part 0/1 in the symbol l, $N_{ZP,l}^0$ is a length of a zero power padding that should be added to the divided data of the part 0 in the symbol l, a length of a zero power padding that is actually added is $N_{ZP,l}^0 - N_{w,l}^0$, $N_{w,l}^0 \leq N_{ZP,l}^0$, $N_l^0$ is a length of the divided data of the part 0 in the symbol l, and N is an IFFT symbol length.

The time domain window function $w^f(t)$ is defined as:

$$w^f(t) = \begin{cases} w_{ini}^{f-1}(t), & 0 \leq t < N_{w,l}^{f-1} \times T_s \\ 1, & N_{w,l}^{f-1} \times T_s \leq t < N_l^f \times T_s \\ 1 - w_{ini}^f(t), & N_l^f \times T_s \leq t < (N_{w,l}^f + N_l^f) \times T_s \end{cases}$$

where $N_l^f$ is a length of the divided data of the part f in the symbol l, $N_{w,l}^f$ is a length of symmetric time domain windows for which a sum of coefficients is 1 in the time domain window point multiplication function of the divided data of the part f in the symbol l, $w_{ini}^f(t)$ is a window function whose coefficient gradually increases and satisfies $w_{ini}^f(t) + w_{ini}^f(N_{w,l}^f \times T_s - t) = 1$, and if f−1<0, f=F.

Optionally, in uplink data transmission, an uplink SC-FDMA symbol sent may be implemented based on the following mathematical expression:

When time domain data of each symbol is divided into two parts (F=2), continuous time domain data $s_l^{(p)}(t)$ that is transmitted on the antenna port p and that is in the SC-FDMA symbol l in an uplink timeslot is defined as:

$$s_l^{(p)}(t) = \begin{cases} w_l^0(t) \left[ \sum_{k=-\lfloor N_{RB}^{UL}N_{sc}^{RB}/2 \rfloor}^{\lceil N_{RB}^{UL}N_{sc}^{RB}/2 \rceil - 1} a_{k^{(-)},l}^{(p)} \cdot e^{j2\pi(k+1/2)\Delta ft} \right], & 0 \leq t < (N_{w,l}^0 + N_l^0) \times T_s \\ 0, & (N_{w,l}^0 + N_l^0) \times T_s \leq t < (N_{ZP,l}^0 + N_l^0) \times T_s \\ w_l^1(t - (N_{w,l}^0 + N_l^0) \times T_s) \left[ \sum_{k=-\lfloor N_{RB}^{UL}N_{sc}^{RB}/2 \rfloor}^{\lceil N_{RB}^{UL}N_{sc}^{RB}/2 \rceil - 1} a_{k^{(-)},l}^{(p)} \cdot e^{j2\pi(k+1/2)\Delta f(t - N_{ZP,l}^0 T_s)} \right], & (N_{ZP,l}^0 + N_l^0) \times T_s \leq t < (N_{ZP,l}^0 + N_{w,l}^1 + N) \times T_s \\ 0, & (N_{ZP,l}^0 + N_{w,l}^1 + N) \times T_s \leq t < (N_{ZP,l} + N) \times T_s \end{cases}$$

where a definition of the time domain window function $w^f(t)$ is the same as that on a downlink.

Figure 7:
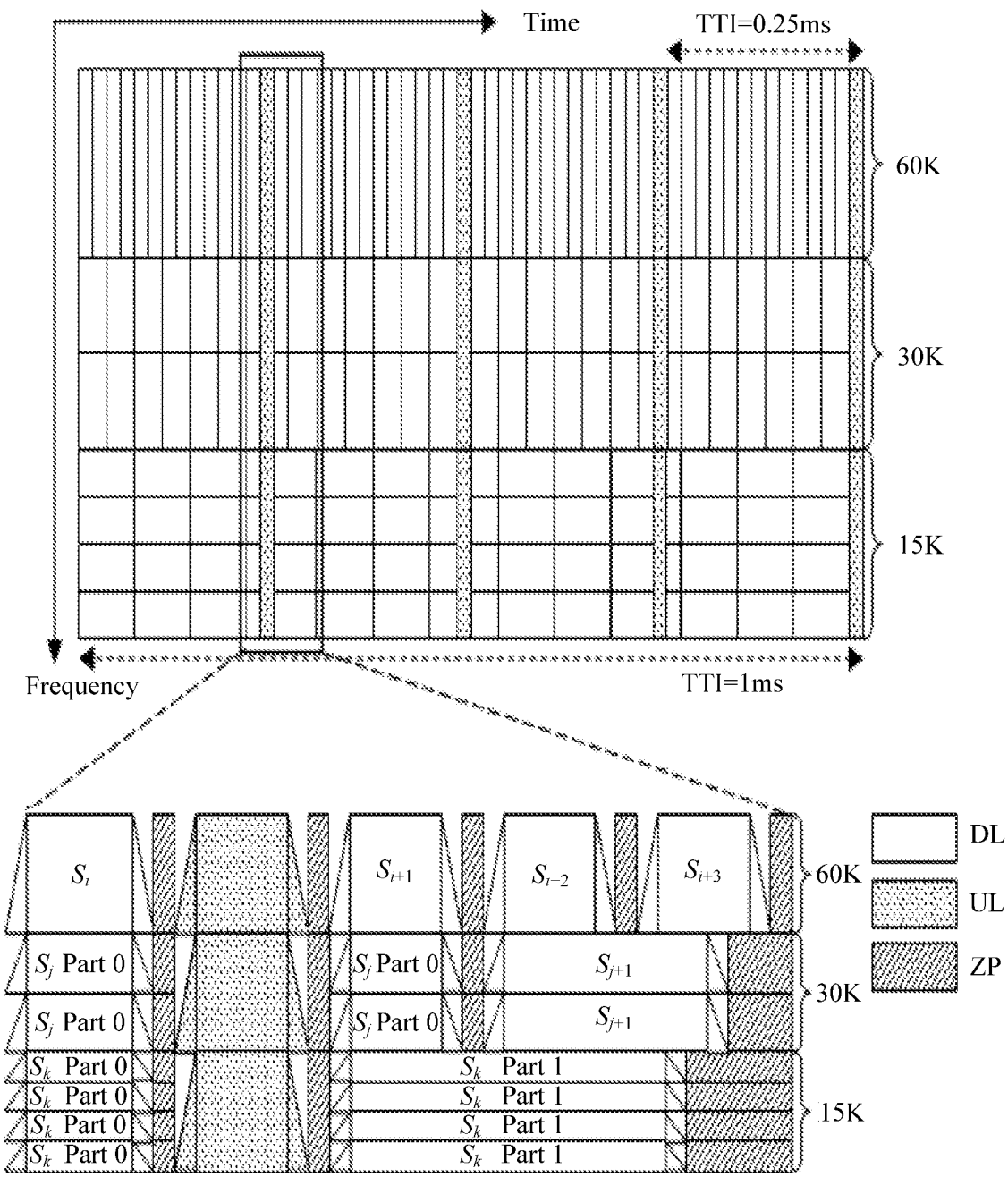
FIG. 7 is a schematic diagram of another embodiment of a signal processing method according to an embodiment of the present disclosure.

As shown in FIG. 7, FIG. 7 is a schematic diagram of another embodiment of a signal processing method according to an embodiment of the present disclosure. In a case of frequency division on a same time-frequency resource in a hybrid frame format in a TDD mode, different subcarrier width symbols (for example, 15 K, 30 K, and 60 K) are frequency division multiplexed on a same time-frequency resource, and each subframe includes 14 symbols. A subframe length of the maximum subcarrier interval (60 K) is used to align with uplink points during downlink switching, data is transmitted in one subframe by using 13 symbols, and data of the other direction after switching is transmitted by using a length of one symbol.

In FIG. 7, the x-axis shows a time time, the y-axis shows a frequency frequency, TTI indicates a transmission time interval transmission time interval, DL indicates a downlink, and UL indicates an uplink. Symbols included by 60 K may be $S_i$, $S_{i+1}$, $S_{i+2}$, $S_{i+3}$, and the like, symbols included by 30 K may be $S_j$, $S_{j+1}$, $S_{j+2}$, $S_{j+3}$, and the like, and symbols included by 30 K may be $S_k$, $S_{k+1}$, $S_{k+2}$, $S_{k+3}$, and the like.

After a symbol of a small subcarrier interval is switched, data of the other direction is transmitted by using a symbol of the maximum subcarrier interval. In the figure, for example, when 15 K or 30 K is switched, uplink data is transmitted by using a subcarrier symbol of 60 K. An uplink ACK/NACK is immediately transmitted in a last symbol in each subframe of 60 K, and an uplink symbol of 15 K or 30 K may be padded with a GP or may be padded with data/a SRS measurement pilot or the like.

15 K and 30 K divide a complete symbol into two parts that are transmitted before and after a symbol of 60 K transmitted during uplink switching. Lengths of symbols of divided data of two parts that are transmitted before and after symbols of 60 K transmitted during different uplink switching may be different. Lengths of divided data of the two parts are allocated based on a vacant time length between the symbol of 60 K transmitted during uplink switching and a previous data symbol of 15 K/30 K, so that a vacant resource is exactly fully padded.

A ZP added to a tail end of a symbol is used as a GP required in downlink-to-uplink switching. The GP is replaced in the TDD mode. This reduces overheads and can support dynamic TDD that is more flexible, and windowing can ensure an effect of a sufficient low OOB.

For data copying and windowing operations of data of two parts obtained after dividing a symbol of 15 K or 30 K, refer to the manner in the embodiment shown in FIG. 6. For data copying and windowing operations of a complete OFDM symbol that is not divided, refer to the manner in the embodiment shown in FIG. 2, FIG. 4, or FIG. 5.

Certainly, when a requirement on an OOB is not very high, data copying and windowing operations may not be performed.

Figure 8:
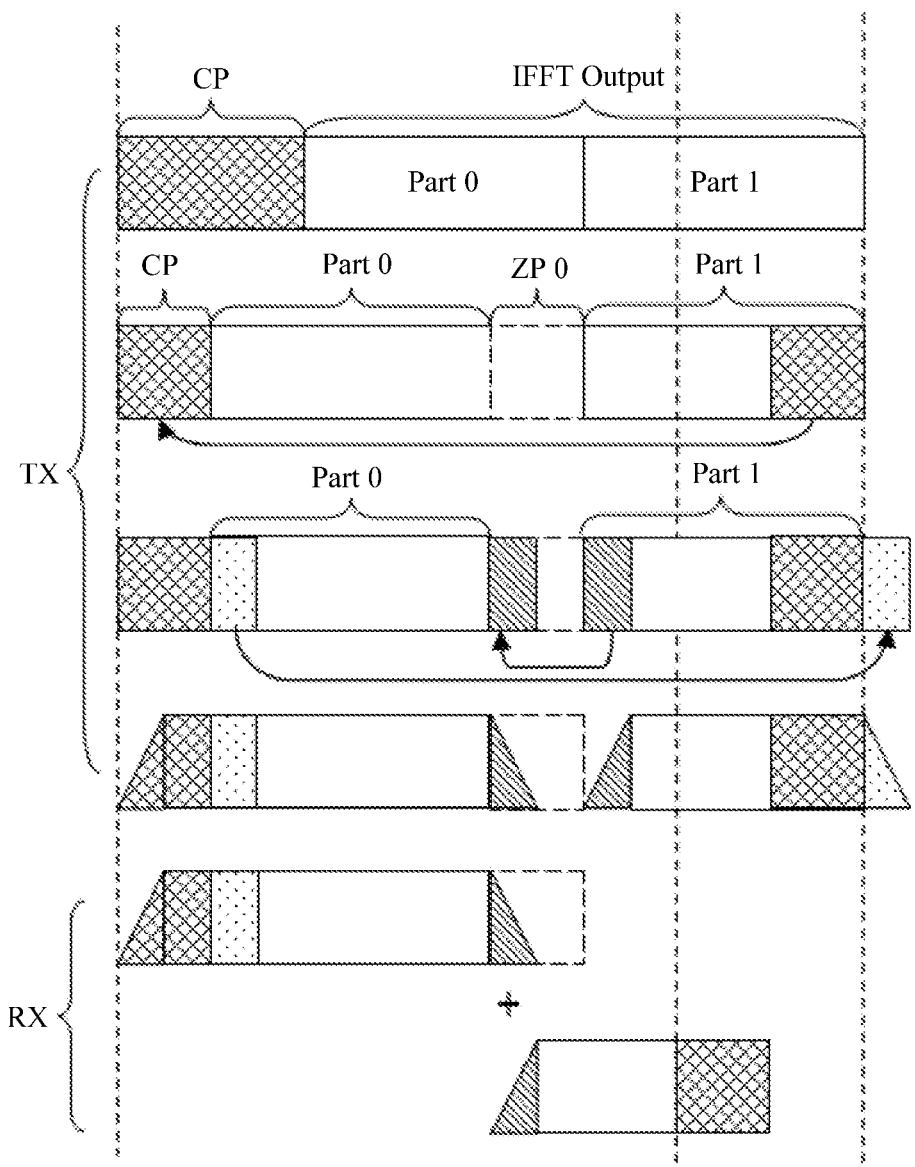
FIG. 8 is a schematic diagram of another embodiment of a signal processing method according to an embodiment of the present disclosure.

As shown in FIG. 8, FIG. 8 is a schematic diagram of another embodiment of a signal processing method according to an embodiment of the present disclosure. A symbol is divided based on a CP-OFDM frame format. After a data IFFT operation is performed at a transmit end, a time domain symbol output by IFFT is divided into F parts. For example, F=2 in the embodiment. A ZP is added between divided data of two neighboring parts obtained after division, to perform isolation, and partial data at a tail end of divided data of a last part is copied to a head end of divided data of a first part to serve as a cyclic prefix. For the divided data of the two neighboring parts of the part f and the part f+1, the data of the $N_w^f$ points at the head end of the divided data of the part f+1 is copied to the start location in the zero power padding at the tail end of the divided data of the part f. Point multiplication is performed between the data of the $N_w^f$ points at the head end of the divided data of the part f+1 and the data of the $N_w^f$ points copied to the zero power padding at the tail end of the divided data of the part f, and the symmetric window functions.

Then, the data of the $N_w^{F-1}$ points at the head end of the divided data of the part 0 is copied to the tail end of the divided data of the last part, to serve as a cyclic suffix of the divided data of the last part. Point multiplication is performed between the data of the $N_w^{F-1}$ points in the cyclic prefix at the head end of the divided data of the part 0 and the data of the $N_w^{F-1}$ points in the cyclic suffix copied to the tail end of the divided data of the last part, and the symmetric window functions.

The foregoing method embodiments separately have the following advantages:

(1) A ZP may replace a GP in a TDD mode. This reduces overheads and can support dynamic TDD that is more flexible, and windowing can ensure an effect of a sufficient low OOB.

(2) A power ramp up/down (ramp up/down) requirement of a power amplifier when beam switching is performed in analog beamforming can be better supported in a massive multiple-input multiple-output massive MIMO system.

(3) An asynchronization resistance capability is better compared with that of a time domain windowing method of CP-OFDM, and performance is better during asynchronization.

(4) While ensuring an OOB, symbol division and windowing can better support immediate ACK/NACK feedback of a broad subcarrier signal of a low-delay service in a hybrid frame format, and do not waste resource puncturing introduced to align with a GP for a narrow subcarrier signal.

(5) Simpler and more precise synchronization and measurement of interference between neighboring cells, and the like may be performed by using the zero power padding ZP.

(6) If a minimum mean square error (Minimum Mean Square Error, MMSE) receiver is supported, an additional power gain of 7% can be obtained.

The foregoing describes the signal processing method in the embodiments of the present disclosure, and the following describes a transmitter in the embodiments of the present disclosure.

Figure 9:
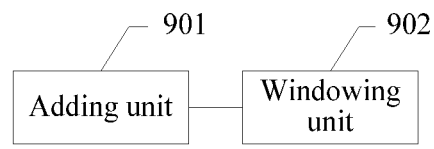
FIG. 9 is a modular block diagram of an embodiment of a transmitter according to an embodiment of the present disclosure.

Referring to FIG. 9, FIG. 9 is a modular block diagram of an embodiment of a transmitter according to an embodiment of the present disclosure. The transmitter is applied to an OFDM wireless transmission system, the system includes at least two OFDM symbols, and the transmitter includes:

an adding unit 901, configured to: add a zero power padding ZP to a tail end of each of the at least two OFDM symbols; and add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol, where the first OFDM symbol includes data of N points, and $N > N_w$; and a windowing unit 902, configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1.

Optionally, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to add data of $N_w$ consecutive points at a head end of the first OFDM symbol of the at least two OFDM symbols to a start location in a ZP at a tail end of the first OFDM symbol, so that the data of the $N_w$ points is used as the suffix of the first OFDM symbol.

Optionally, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to add data of $N_w$ consecutive points at the tail end of the first OFDM symbol of the at least two OFDM symbols to an end location in a ZP at a tail end of a second OFDM symbol of the at least two OFDM symbols, so that the data of the $N_w$ points is used as the prefix of the first OFDM symbol, where the second OFDM symbol is a previous neighboring OFDM symbol of the first OFDM symbol, and a tail end of the ZP is connected to the head end of the first OFDM.

Optionally, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add data of $N_w$ consecutive points at the head end of the first OFDM symbol of the at least two OFDM symbols to the start location in a ZP at the tail end of the first OFDM symbol, so that the data of the $N_w$ points is used as the suffix of the first OFDM symbol; and add data of $N_w$ consecutive points at the tail end of the first OFDM symbol of the at least two OFDM symbols to an end location in a ZP at a tail end of a second OFDM symbol of the at least two OFDM symbols, so that the data of the $N_w$ points is used as the prefix of the first OFDM symbol, where the second OFDM symbol is a previous neighboring OFDM symbol of the first OFDM symbol, and a tail end of the ZP is connected to the head end of the first OFDM.

Optionally, before the adding unit adds the ZP to the tail end of each of the at least two OFDM symbols, the transmitter further includes:

a division unit, configured to divide the first OFDM symbol of the at least two OFDM symbols into F parts, where F≥2, where the adding unit is configured to add a ZP to a tail end of each of the at least two OFDM symbols includes:

the adding unit is configured to add the ZP to a tail end of divided data of each part obtained by dividing the first OFDM symbol of the at least two OFDM symbols.

Optionally, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add data of $N_w^f$ consecutive points at a head end of divided data of a part f+1 obtained after dividing the first OFDM symbol of the at least two OFDM symbols to a start location in a ZP at a tail end of divided data of a part f, so that the data of the $N_w^f$ points is used as a suffix of the divided data of the part f; and add data of $N_w^{F-1}$ consecutive points at a head end of divided data of a part 0 to a start location in a ZP at a tail end of divided data of a part F−1, so that the data of the $N_w^{F-1}$ points is used as a suffix of the divided data of the part F−1, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; and perform point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

Optionally, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add the data of the $N_w^f$ consecutive points at the tail end of the divided data of the part f obtained after dividing the first OFDM symbol of the at least two OFDM symbols to the end location in the ZP at the tail end of the divided data of the part f, so that the data of the $N_w^f$ points is used as the prefix of the divided data of the part f+1; and add the data of a continuous length at the head end of the divided data of the part 0 to the start location in the ZP at the tail end of the divided data of the part F−1, so that the data of the $N_w^{F-1}$ points is used as the suffix of the divided data of the part F−1, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of a continuous $N_w^f$ length at the tail end of the divided data of the part f and the data of the $N_w^f$ points in the prefix at the head end of the divided data of the part f+1, so that the sum of the point coefficients corresponding to the symmetric window function is 1; and perform point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

Optionally, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add the data of the $N_w^f$ consecutive points at the head end of the divided data of the part f+1 obtained after dividing the first OFDM symbol of the at least two OFDM symbols to the start location in the ZP at the tail end of the divided data of the part f, so that the data of the $N_w^f$ points is used as the suffix of the divided data of the part f; and add the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; and perform point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

Optionally, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add the data of the $N_w^f$ consecutive points at the tail end of the divided data of the part f obtained after dividing the first OFDM symbol of the at least two OFDM symbols to the end location in the ZP at the tail end of the divided data of the part f, so that the data of the $N_w^f$ points is used as the prefix of the divided data of the part f+1; and add the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of a continuous $N_w^f$ length at the tail end of the divided data of the part f and the data of the $N_w^f$ points in the prefix at the head end of the divided data of the part f+1, so that the sum of the point coefficients corresponding to the symmetric window function is 1; and perform point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

Optionally, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add the data of the $N_w^f$ consecutive points at the head end of the divided data of the part f+1 obtained by dividing the first OFDM symbol of the at least two OFDM symbols to the start location in the ZP at the tail end of the divided data of the part f, so that the data of the $N_w^f$ points is used as the suffix of the divided data of the part f; add the data of the $N_w^{F-1}$ consecutive points at the head end of the divided data of the part 0 to the start location in the ZP at the tail end of the divided data of the part F−1, so that the data of the $N_w^{F-1}$ points is used as the suffix of the divided data of the part F−1; and add the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; perform point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1; and perform point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

Optionally, the adding unit is configured to add data of $N_w$ consecutive points at one end of a first OFDM symbol of the at least two OFDM symbols to the ZP at the other end of the first OFDM symbol, so that the data of the $N_w$ points is used as a prefix and/or a suffix of the first OFDM symbol includes:

the adding unit is configured to: add data of $N_w^f$ consecutive points at the tail end of the divided data of the part f obtained by dividing the first OFDM symbol of the at least two OFDM symbols to the end location in the ZP at the tail end of the divided data of the part f, so that the data of the $N_w^f$ points is used as the prefix of the divided data of the part f+1; add the data of the continuous length at the head end of the divided data of the part 0 to the start location in the ZP at the tail end of the divided data of the part F−1, so that the data of the $N_w^{F-1}$ points is used as the suffix of the divided data of the part F−1; and add the data of the $N_w^{F-1}$ consecutive points at the tail end of the divided data of the part F−1 to an end location in a ZP at a tail end of previous neighboring divided data or the ZP at the tail end of the previous OFDM symbol at the head end of the divided data of the part 0, so that the data of the $N_w^{F-1}$ points is used as the prefix of the divided data of the part 0, where 0≤f<F; and the windowing unit is configured to perform point multiplication processing with symmetric time domain window function on the data of the $N_w$ points at the two ends of the first OFDM symbol to which the prefix and/or the suffix is added, so that a sum of point coefficients corresponding to the symmetric time domain window function is 1 includes:

the windowing unit is configured to: perform point multiplication processing with symmetric time domain window function on the data of the continuous $N_w^f$ length at the tail end of the divided data of the part f and the data of the $N_w^f$ points in the prefix at the head end of the divided data of the part f+1, so that the sum of the point coefficients corresponding to the symmetric window function is 1; perform point multiplication processing with symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1; and perform point multiplication processing with symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

Figure 10:
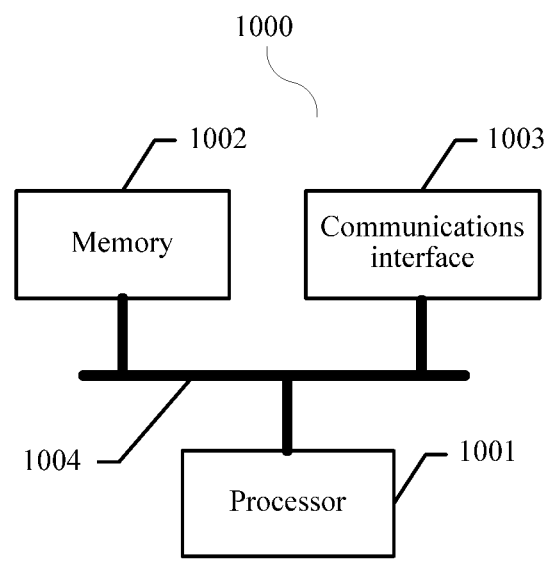
FIG. 10 is a hardware block diagram of an embodiment of a transmitter according to an embodiment of the present disclosure.

Referring to FIG. 10, FIG. 10 is a hardware block diagram of an embodiment of a transmitter according to an embodiment of the present disclosure. The transmitter 1000 is applied to an OFDM wireless transmission system, where the system includes at least two OFDM symbols. The transmitter 1000 includes: a processor 1001, a memory 1002, a communications interface 1003, and a bus 1004. The processor 1001, the memory 1002, and the communications interface 1003 are connected by using the bus 1004. The memory 1002 is configured to store program code. The processor 1001 is configured to invoke the program code to perform the signal processing method according to any one of the foregoing implementations.

The wireless transmission system may be a Long Term Evolution (Long Term Evolution, LTE) system of a universal mobile communications technology, or may be other wireless communications systems, for example, a Global System for Mobile Communications (Global System for Mobile Communications, GSM), a Universal Mobile Telecommunications System (Universal Mobile Telecommunications System, UMTS), a Code Division Multiple Access (Code Division Multiple Access, CDMA) system, a future evolved network system, and the like. Specifics are not limited herein.

The transmitter 1000 may be a transmitter of an uplink terminal (User Equipment, UE) in the system, or may be a transmitter of a downlink base station in the system. Specifics are not limited herein.

A general-purpose central processing unit (Central Processing Unit, CPU), a microprocessor, an application-specific integrated circuit (Application-Specific Integrated Circuit, ASIC), or one or more integrated circuits may be used as the processor 1001. The processor 1001 is configured to execute a related program to implement the technical solutions provided in the embodiments of the present disclosure.

The memory 1002 may be a read-only memory (Read-only memory, ROM), a static storage device, a dynamic storage device, or a random access memory (Random Access Memory, RAM). The memory 1002 may store an operating system and another application program. When the technical solutions provided in the embodiments of the present disclosure are implemented by using software or firmware, program code used to implement the technical solutions provided in the embodiments of the present disclosure is stored in the memory 1002, and is executed by the processor 1001.

The communications interface 1003 uses, but is not limited to, for example, a transceiver apparatus such as a transceiver, to implement communication between the transmitter 1000 and another device or a communications network.

The bus 1004 may include a path, and transfers information between the components of the transmitter 1000 (for example, the processor 1001, the memory 1002, and the communications interface 1003).

It should be noted that although the transmitter 1000 shown in FIG. 10 shows only the processor 1001, the memory 1002, the communications interface 1003, and the bus 1004, in a specific implementation process, persons skilled in the art shall understand that the transmitter 1000 further includes another device required by a normal operation. In addition, based on a specific requirement, persons skilled in the art shall understand that the transmitter 1000 may further include a hardware device for implementing another additional function. In addition, persons skilled in the art shall understand that the transmitter 1000 may include only devices required to implement the embodiments of the present disclosure, and do not need to include all devices shown in FIG. 10.

It may be clearly understood by persons skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the blocks of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method, wherein the method is applied to an orthogonal frequency division multiplexing (OFDM) wireless transmission system comprising at least two OFDM symbols, the method comprising:
   dividing, by a transmitter, a first OFDM symbol of the at least two OFDM symbols into F parts, wherein F≥2;
   adding, by the transmitter, a zero power padding (ZP) to a tail end of each of the at least two OFDM symbols by:
      adding, by the transmitter, the ZP to a tail end of divided data of each part obtained after dividing the first OFDM symbol of the at least two OFDM symbols;
   adding, by the transmitter, data of $N_w$ consecutive points at one end of the first OFDM symbol of the at least two OFDM symbols to the ZP at the other end of the first OFDM symbol, so that the data of the $N_w$ points is used as at least one of a prefix or a suffix of the first OFDM symbol, wherein the first OFDM symbol comprises data of N points, and N>$N_w$; and
   performing, by the transmitter, point multiplication processing with a symmetric time domain window function on the data of the $N_w$ points at the two ends of the first OFDM symbol to which at least one of the prefix or the suffix is added, so that a sum of point coefficients corresponding to the symmetric time domain window function is 1.

2. The method of claim 1, wherein the adding, by the transmitter, data of $N_w$ consecutive points comprises:
   adding, by the transmitter, data of $N_w^f$ consecutive points at a head end of divided data of a part f+1 obtained after dividing the first OFDM symbol of the at least two OFDM symbols to a start location in a ZP at a tail end of divided data of a part f, so that the data of the $N_w^f$ points is used as a suffix of the divided data of the part f; and adding data of $N_w^{F-1}$ consecutive points at a head end of divided data of a part 0 to a start location in a ZP at a tail end of divided data of a part F−1, so that the data of the $N_w^{F-1}$ points is used as a suffix of the divided data of the part F−1, wherein 0≤f<F; and
   the performing, by the transmitter, point multiplication processing with a symmetric time domain window function on the data of the $N_w$ points comprises:
   performing, by the transmitter, point multiplication processing with the symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; and performing point multiplication processing with the symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

3. The method of claim 1, wherein the adding, by the transmitter, data of $N_w$ consecutive points comprises:
   adding, by the transmitter, data of $N_w^f$ consecutive points at a tail end of divided data of a part f obtained after dividing the first OFDM symbol of the at least two OFDM symbols to an end location in the ZP at the tail end of the divided data of the part f, so that the data of the $N_w^f$ points is used as a prefix of divided data of a part f+1; and adding data of continuous $N_w^{F-1}$ points at a head end of divided data of a part 0 to a start location in the ZP at a tail end of divided data of a part F−1, so that the data of the $N_w^{F-1}$ points is used as a suffix of the divided data of the part F−1, wherein 0≤f<F; and
   the performing, by the transmitter, point multiplication processing with a symmetric time domain window function on the data of the $N_w$ points comprises:
   performing, by the transmitter, point multiplication processing with the symmetric time domain window function on the data of the continuous $N_w^f$ points at the tail end of the divided data of the part f and the data of the $N_w^f$ points in the prefix at the head end of the divided data of the part f+1, so that the sum of the point coefficients corresponding to the symmetric window function is 1; and performing point multiplication processing with the symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

4. The method of claim 3, wherein the adding, by the transmitter, data of $N_w$ consecutive points 1 comprises:
   adding, by the transmitter, data of $N_w^f$ consecutive points at a head end of divided data of a part f+1 obtained after dividing the first OFDM symbol of the at least two OFDM symbols to a start location in a ZP at a tail end of divided data of a part f, so that the data of the $N_w^f$ points is used as a suffix of the divided data of the part f; and adding data of $N_w^{F-1}$ consecutive points at a tail end of divided data of a part F−1 to an end location in a ZP at a tail end of previous neighboring divided data or a ZP at a tail end of a previous OFDM symbol at a head end of divided data of a part 0, so that the data of the $N_w^{F-1}$ points is used as a prefix of the divided data of the part 0, wherein 0≤f<F; and
   the performing, by the transmitter, point multiplication processing with a symmetric time domain window function on the data of the $N_w$ points comprises:
   performing, by the transmitter, point multiplication processing with the symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; and performing point multiplication processing with the symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

5. The method of claim 1, wherein the adding, by the transmitter, data of $N_w$ consecutive points comprises:

adding, by the transmitter, data of $N_w^f$ consecutive points at a tail end of divided data of a part f obtained after dividing the first OFDM symbol of the at least two OFDM symbols to an end location in a ZP at the tail end of the divided data of the part f, so that the data of the $N_w^f$ points is used as a prefix of divided data of a part f+1; and adding data of $N_w^{F-1}$ consecutive points at a tail end of divided data of a part F−1 to an end location in a ZP at a tail end of previous neighboring divided data or a ZP at a tail end of a previous OFDM symbol at a head end of divided data of a part 0, so that the data of the $N_w^{F-1}$ points is used as a prefix of the divided data of the part 0, wherein 0≤f<F; and the performing, by the transmitter, point multiplication processing with a symmetric time domain window function on the data of the $N_w$ points comprises:

performing, by the transmitter, point multiplication processing with the symmetric time domain window function on the data of the continuous $N_w^f$ points at the tail end of the divided data of the part f and the data of the $N_w^f$ points in the prefix at the head end of the divided data of the part f+1, so that the sum of the point coefficients corresponding to the symmetric window function is 1; and performing point multiplication processing with the symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

6. The method of claim 1, wherein the adding, by the transmitter, data of $N_w$ consecutive points comprises:

adding, by the transmitter, data of $N_w^f$ consecutive points at a head end of divided data of a part f+1 obtained after dividing the first OFDM symbol of the at least two OFDM symbols to a start location in a ZP at a tail end of divided data of a part f, so that the data of the $N_w^f$ points is used as a suffix of the divided data of the part f; adding data of $N_w^{F-1}$ consecutive points at a head end of divided data of a part 0 to a start location in a ZP at a tail end of divided data of a part F−1, so that the data of the $N_w^{F-1}$ points is used as a suffix of the divided data of the part F−1; and adding data of $N_w^{F-1}$ consecutive points at the tail end of the divided data of the part F−1 to an end location in a ZP at a tail end of previous neighboring divided data or a ZP at a tail end of a previous OFDM symbol at the head end of the divided data of the part 0, so that the data of the $N_w^{F-1}$ points is used as a prefix of the divided data of the part 0, wherein 0≤f<F; and the performing, by the transmitter, point multiplication processing with a symmetric time domain window function on the data of the $N_w$ points comprises:

performing, by the transmitter, point multiplication processing with the symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; performing point multiplication processing with the symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1; and performing point multiplication processing with the symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

7. The method of claim 1, wherein the adding, by the transmitter, data of $N_w$ consecutive points comprises:

adding, by the transmitter, data of $N_w^f$ consecutive points at a tail end of divided data of a part f obtained after dividing the first OFDM symbol of the at least two OFDM symbols to an end location in a ZP at the tail end of the divided data of the part f, so that the data of the $N_w^f$ points is used as a prefix of divided data of a part f+1; adding data of a continuous $N_w^{F-1}$ points at a head end of divided data of a part 0 to a start location in a ZP at a tail end of divided data of a part F−1, so that the data of the $N_w^{F-1}$ points is used as a suffix of the divided data of the part F−1; and adding data of $N_w^{F-1}$ consecutive points at the tail end of the divided data of the part F−1 to an end location in a ZP at a tail end of previous neighboring divided data or a ZP at a tail end of a previous OFDM symbol at the head end of the divided data of the part 0, so that the data of the $N_w^{F-1}$ points is used as a prefix of the divided data of the part 0, wherein 0≤f<F; and the performing, by the transmitter, point multiplication processing with a symmetric time domain window function on the data of the $N_w$ points comprises:

performing, by the transmitter, point multiplication processing with the symmetric time domain window function on the data of the continuous $N_w^f$ points at the tail end of the divided data of the part f and the data of the $N_w^f$ points in the prefix at the head end of the divided data of the part f+1, so that the sum of the point coefficients corresponding to the symmetric window function is 1; performing point multiplication processing with the symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1; and performing point multiplication processing with the symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

8. A transmitter, applied to an OFDM wireless transmission system comprising at least two OFDM symbols, the transmitter comprising: a processor, a memory, and a bus, the processor is connected to the memory by using the bus, the memory is configured to store program code, and the processor is configured to execute the program code to:

divide, a first OFDM symbol of at least two OFDM symbols into F parts, wherein F≥2;

add a zero power padding ZP to a tail end of each of the at least two OFDM symbols by:

adding the ZP to a tail end of divided data of each part obtained after dividing the first OFDM symbol of the at least two OFDM symbols;

add data of $N_w$ consecutive points at one end of the first OFDM symbol of the at least two OFDM symbols to the ZP at the other end of the first OFDM symbol, so that the data of the $N_w$ points is used as at least one of a prefix or a suffix of the first OFDM symbol, wherein the first OFDM symbol comprises data of N points, and $N > N_w$; and perform point multiplication processing with a symmetric time domain window function on the data of the $N_w$ points at the two ends of the first OFDM symbol to which at least one of the prefix or the suffix is added, so that a sum of point coefficients corresponding to the symmetric time domain window function is 1.

9. The transmitter of claim 8, wherein the processor is configured to execute the program code to:

add data of $N_w^f$ consecutive points at a head end of divided data of a part f+1 obtained after dividing the first OFDM symbol of the at least two OFDM symbols to a start location in a ZP at a tail end of divided data of a part f, so that the data of the $N_w^f$ points is used as a suffix of the divided data of the part f; and add data of $N_w^{F-1}$ consecutive points at a head end of divided data of a part 0 to a start location in a ZP at a tail end of divided data of a part F−1, so that the data of the $N_w^{F-1}$ points is used as a suffix of the divided data of the part F−1, wherein 0≤f<F; and perform point multiplication processing with the symmetric time domain window function on the data of the $N_w^f$ consecutive points at the head end of the divided data of the part f+1 and the data of the $N_w^f$ points in the suffix at the tail end of the divided data of the part f, so that the sum of the point coefficients corresponding to the symmetric window function is 1; and perform point multiplication processing with the symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

10. The transmitter of claim 8, wherein the processor is configured to execute the program code to:

add data of $N_w^f$ consecutive points at a tail end of divided data of a part f obtained after dividing the first OFDM symbol of the at least two OFDM symbols to an end location in the ZP at the tail end of the divided data of the part f, so that the data of the $N_w^f$ points is used as a prefix of divided data of a part f+1; and add data of a continuous $N_w^{F-1}$ points at a head end of divided data of a part 0 to a start location in the ZP at a tail end of divided data of a part F−1, so that the data of the $N_w^{F-1}$ points is used as a suffix of the divided data of the part F−1, wherein 0≤f<F; and perform point multiplication processing with the symmetric time domain window function on the data of the continuous $N_w^f$ points at the tail end of the divided data of the part f and the data of the $N_w^f$ points in the prefix at the head end of the divided data of the part f+1, so that the sum of the point coefficients corresponding to the symmetric window function is 1; and perform point multiplication processing with the symmetric time domain window function on the data of the $N_w^{F-1}$ consecutive points at the head end of the divided data of the part 0 and the data of the $N_w^{F-1}$ points in the suffix at the tail end of the divided data of the part F−1, so that the sum of the point coefficients corresponding to the symmetric window function is 1.

11. The transmitter of claim 8, wherein the processor is configured to execute the program code to:

add data of $N_w^f$ consecutive points at a head end of divided data of a part f+1 obtained after dividing the first OFDM symbol of the at least two OFDM symbols to a start location in a ZP at a tail end of divided data of a part f, so that the data of the $N_w^f$ points is used as a suffix of the divided data of the part f; and add data of $N_w^{F-1}$ consecutive points at a tail end of divided data of a part F−1 to an end location in a ZP at a tail end of previous neighboring divided data or a ZP at a tail end of a previous OFDM symbol at a head end of divided data of a part 0, so that the data of the $N_w^{F-1}$ points is used as a prefix of the divided data of the part 0, wherein 0≤f<F; and perform point multiplication processing with the symmetric time domain window function on the data of the $N_w^f$ consecutive points at the head end of the divided data of the part f+1 and the $N_w^f$ data of the points in the suffix at the tail end of the divided data of the part f, so that the sum of the point coefficients corresponding to the symmetric window function is 1; and perform point multiplication processing with the symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

12. The transmitter of claim 8, wherein the processor is configured to execute the program code to:

add data of $N_w^f$ consecutive points at a tail end of divided data of a part f obtained after dividing the first OFDM symbol of the at least two OFDM symbols to an end location in a ZP at the tail end of the divided data of the part f, so that the data of the $N_w^f$ points is used as a prefix of divided data of a part f+1; and add data of $N_w^{F-1}$ consecutive points at a tail end of divided data of a part F−1 to an end location in a ZP at a tail end of previous neighboring divided data or a ZP at a tail end of a previous OFDM symbol at a head end of divided data of a part 0, so that the data of the $N_w^{F-1}$ points is used as a prefix of the divided data of the part 0, wherein 0≤f<F; and perform point multiplication processing with the symmetric time domain window function on the data of the continuous $N_w^f$ points at the tail end of the divided data of the part f and the data of the $N_w^f$ points in the prefix at the head end of the divided data of the part f+1, so that the sum of the point coefficients corresponding to the symmetric window function is 1; and perform point multiplication processing with the symmetric time domain window function on the data of the $N_w^{F-1}$ points in the prefix at the head end of the divided data of the part 0 and the data of the $N_w^{F-1}$ consecutive points at the tail end of the divided data of the part F−1, so that the sum of the point coefficients corresponding to the symmetric window function is 1.

* * * * *